(12) United States Patent
Shitara et al.

(10) Patent No.: US 7,500,271 B2
(45) Date of Patent: Mar. 3, 2009

(54) REPRODUCING APPARATUS AND INFORMATION DISTRIBUTION SYSTEM

(75) Inventors: Teruyuki Shitara, Tokyo (JP); Ichiro Mayama, Tokyo (JP); Eiichi Yamada, Tokyo (JP)

(73) Assignee: Sony Corporation (JP)

( * ) Notice: Subject to any disclaimer, the term of this patent is extended or adjusted under 35 U.S.C. 154(b) by 815 days.

(21) Appl. No.: 10/869,399

(22) Filed: Jun. 16, 2004

(65) Prior Publication Data

US 2005/0007925 A1    Jan. 13, 2005

Related U.S. Application Data

(62) Division of application No. 09/521,177, filed on Mar. 8, 2000, now Pat. No. 6,868,494.

(30) Foreign Application Priority Data

Mar. 9, 1999  (JP)  ............... P11-061547
Mar. 1, 2000  (JP)  ............ P2000-060328

(51) Int. Cl.
*H04K 1/02*  (2006.01)
*H04L 9/00*  (2006.01)
*H04N 7/16*  (2006.01)
*H03M 1/66*  (2006.01)

(52) U.S. Cl. ............... 726/31; 713/189; 713/193; 726/27; 380/201; 705/51; 705/57

(58) Field of Classification Search ............... 713/189, 713/193; 380/201; 705/51, 57; 726/27, 726/31

See application file for complete search history.

(56) References Cited

U.S. PATENT DOCUMENTS 5,636,096 A    6/1997  Mardirossian
5,757,909 A    5/1998  Park et al.
5,768,389 A    6/1998  Ishii et al.
5,787,171 A    7/1998  Kubota et al.
5,787,179 A    7/1998  Ogawa et al.
5,793,973 A *  8/1998  Birdwell et al. ............. 709/223
5,896,255 A    4/1999  Mardirossian
6,061,451 A    5/2000  Muratani et al.

(Continued)

FOREIGN PATENT DOCUMENTS

JP    7064841    3/1995

(Continued)

OTHER PUBLICATIONS

Alfred J. Menezes, Paul C. van Oorschot, Scott A. Vanstone, Handbook of Applied Cryptography, 1996, CRC Press, p. 494..

*Primary Examiner*—Michael J Simitoski
(74) *Attorney, Agent, or Firm*—Lerner, David, Littenberg, Krumholz & Mentlik, LLP

(57) ABSTRACT

An object of the invention is to make it possible to move data that is coded and managed for copyright protection after evaluating an encryption key and permitting its movement based on a result of the evaluation, as well as to make it possible to copy data that is recorded in a server to a terminal apparatus and cause the terminal apparatus itself to reproduce the data and, where a terminal apparatus is connected to the server, render data on the server reproducible.

8 Claims, 19 Drawing Sheets

U.S. PATENT DOCUMENTS

| | | |
|---|---|---|
| 6,081,785 A | 6/2000 | Oshima et al. |
| 6,367,019 B1 | 4/2002 | Ansell et al. |
| 6,389,538 B1 | 5/2002 | Gruse et al. |
| 6,418,421 B1 | 7/2002 | Hurtado et al. |
| 6,697,944 B1 | 2/2004 | Jones et al. |

FOREIGN PATENT DOCUMENTS

| | | |
|---|---|---|
| JP | 8-007380 A | 1/1996 |
| JP | 10-143438 A | 5/1998 |
| JP | 10-214233 A | 8/1998 |
| JP | 10-214297 A | 8/1998 |

\* cited by examiner

BOTTOM VIEW

FRONT VIEW

PLAN VIEW

SIDE VIEW

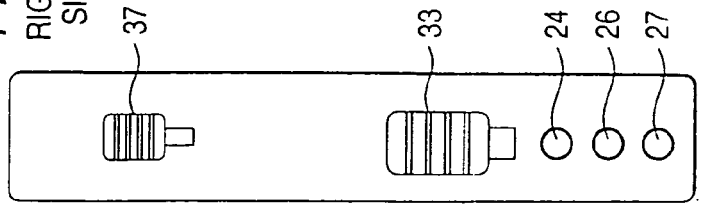
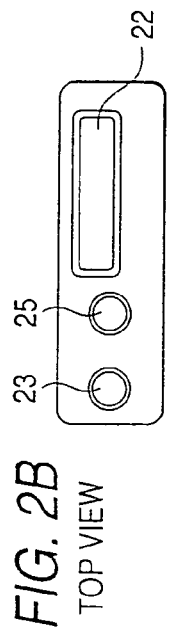
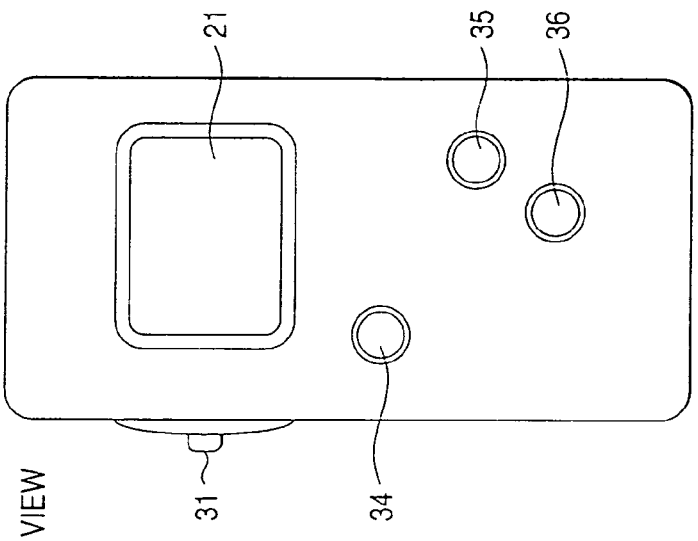
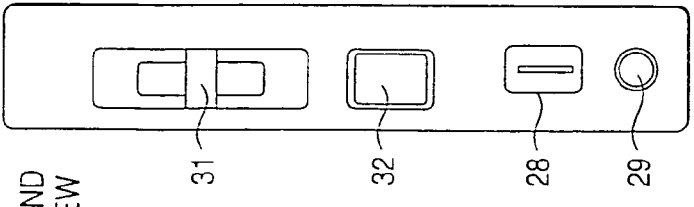

OPERATION (6): REPRODUCTION FROM HDD (OUTPUT ON DRIVE APPARATUS SIDE)

REPRODUCING APPARATUS AND INFORMATION DISTRIBUTION SYSTEM

This application is a divisional application of U.S. application Ser. No. 09/521,177, filed Mar. 8, 2000 now U.S. Pat. No. 6,868,494, which claims the benefit of foreign priority applications filed in Japan on Mar. 1, 2000, as serial number P2000-060382 and on Mar. 9, 1999 as serial number P11-061547.

FIELD OF THE INVENTION

The present invention relates to a recording/reproducing apparatus which moves data that is coded and managed for copyright protection after evaluating an encryption key and permitting its movement based on a result of the evaluation, as well as to an information distribution system which copies data that is recorded in a server to a terminal apparatus and causes the terminal apparatus itself to reproduce the data and, where a terminal apparatus is connected to the server, renders data on the server reproducible.

BACKGROUND OF THE INVENTION

In recent years, small-size recording media incorporating a solid-state recording device such as a flash memory have been developed which can record computer data, still image data, moving image data, musical data, voice data, etc. by using a dedicated drive or a drive that is incorporated in an audio/video apparatus, an information apparatus, or the like.

On the other hand, conventionally, media such as the CD (compact disc) and the MD (mini disc; trademark) have spread as media for recording musical data etc. Data can be recorded on or reproduced from those media by using a CD player or an MD recorder/player.

In information apparatuses such as personal computers, various data files can be recorded on and reproduced from a hard disk drive (HDD) that is incorporated in or connected to such information apparatuses.

In the current situation in which a variety of recording media and recording/reproducing apparatuses and drives therefor have spread, there frequently occurs a case that the user side copies or moves a data file that is recorded on a certain recording medium to another recording medium.

Usually, users perform copying or movement according to necessity that is legitimate. However, as typified by copying of musical data, there may occur a case that a user infringes the copyright of a data file that is owned by another person (in particular, an author or the like) when the user copies it beyond the confines of personal duplication.

In view of the above, in conventional systems capable of copying or dubbing digital musical data such as an MD system and a DAT (digital audio tape) system, plural times of dubbing are prohibited by the SCMS (serial copy management system).

However, in view of the current circumstances, that is, the spread of personal computers, the diversification of data interfaces, and the development and diversification of data communication forms, mere prohibition of plural times of dubbing is insufficient for copyright protection.

SUMMARY OF THE INVENTION

An object of the present invention is to provide a reproducing apparatus which copies or moves main data that has been subjected to reproduction-restrictive coding from a first recording medium where the main data is recorded to a second recording medium, comprising storing means for storing a key to be used for deciphering a code that restricts reproduction of the main data; input means for receiving the main data from the first recording medium; judging means for judging whether the main data received by the input means can be decoded by using the key that is stored in the storing means; output means for outputting the main data received by the input means to the second recording medium; and control means for causing the output means to output the main data received by the input means to the second recording medium if the judging means judges that the main data can be decoded, and for prohibiting the output means from outputting the main data received by the input means to the second recording medium if judging means judges that the main data cannot be decoded.

Another object of the invention is to provide an information distribution system comprising a server apparatus capable of being connected to a terminal apparatus, for supplying coded main data to the terminal apparatus, the server apparatus comprising memory means for recording one or a plurality of coded main data; and transmitting means for transmitting, to the terminal apparatus, coded main data that is read out from the memory means; and the terminal apparatus for decoding and reproducing coded main data, the terminal apparatus comprising receiving means for receiving the coded main data that is transmitted from the transmitting means of the server apparatus; recording means for recording coded main data; decoding means for decoding the coded main data that is received by the receiving means or recorded in the recording means; judging means for judging whether the terminal apparatus is connected to the server apparatus; and control means for permitting the decoding means to decode the coded main data that is received by the receiving means when the judging means judges that the terminal apparatus is connected to the server apparatus, and for permitting the decoding means to decode the coded main data that is recorded in the recording means when the judging means judges that the terminal apparatus is not connected to the server apparatus.

BRIEF DESCRIPTION OF THE DRAWINGS

FIGS. 2A-2E are a plan view, a top view, a left-hand side view, a right-hand side view, and a bottom view, respectively, showing an example appearance of a drive apparatus according to the first embodiment;

DESCRIPTION OF THE PREFERRED EMBODIMENTS

Figure 1D:
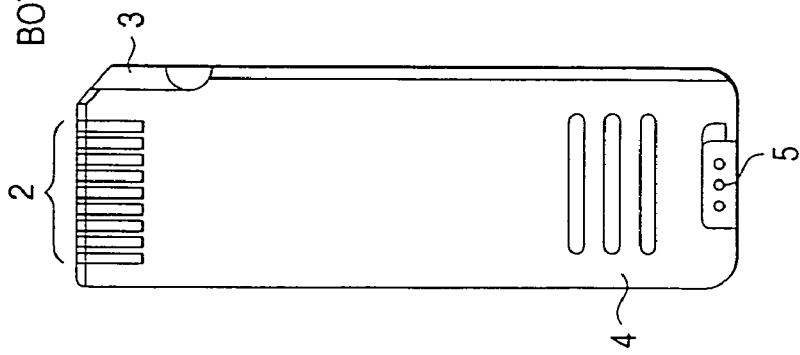
FIGS. 1A-1D are a front view, a side view, a plan view, and a bottom view, respectively, showing the outer shape of a plate-like memory according to a first embodiment of the present invention.
Figure 1A:
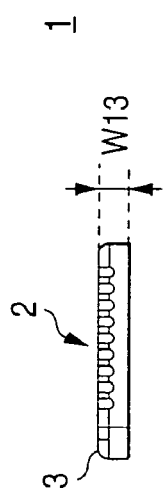
Figure 1C:
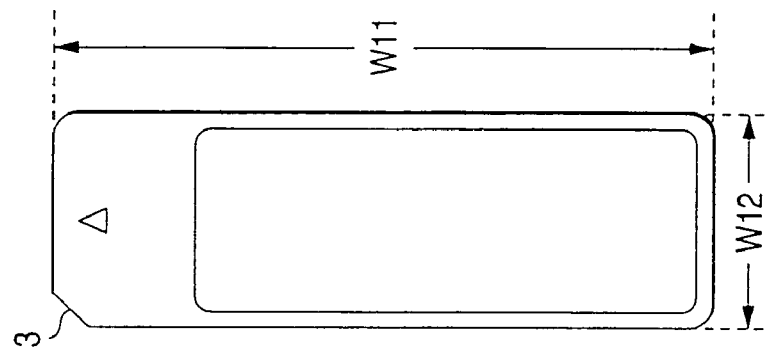
Figure 1B:
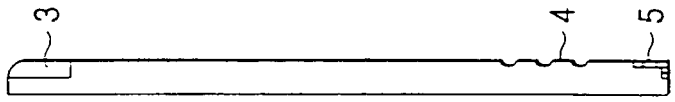

An embodiment of the present invention will be hereinafter described. In the embodiment, a plate-like memory having a plate-like outer shape, a CD, an MD, a CD-ROM, or the like is an example of a recording medium corresponding to the first recording medium according to the invention, and an HDD in a personal computer is an example of a recording medium corresponding to the second recording medium according to the invention.

A drive apparatus capable of performing recording and reproduction on a plate-like memory is an example of the first apparatus and the data processing apparatus according to the invention and a personal computer is an example of the second apparatus according to the invention.

The description will be made according to the following order:

1. Plate-like memory
2. Configuration of drive apparatus
3. Example of system connection
4. Data recording, reproducing, copying, and moving operations (1)-(8)
5. Operations involving recording in HDD
   5-1 Operation (3)
   5-2 Operation (4)
   5-3 Operation (5)
6. Operations involving reproduction from HDD
   6-1 Operation (6)
   6-2 Operation (7)
   6-3 Operation (8)

1. Plate-like Memory

First, the outer shape of a plate-like memory 1 that is a recording medium used in this embodiment will be described with reference to FIGS. 1A-1D.

For example, the plate-like memory 1 has a memory device having a prescribed capacity in a plate-like body as shown in FIGS. 1A-1D. In this embodiment, the memory device is a flash memory.

The body, which is shown in FIGS. 1A-1D that are a front view, a side view, a plan view, and a bottom view, respectively, is a plastic mold. Specific examples of its dimensions are such that widths W11, W12, and W13 (see FIG. 1) are 60 mm, 20 mm, and 2.8 mm, respectively.

A terminal portion 2 having nine electrodes, for example, is formed on the body so as to extend from a lower portion of the front surface to a front portion of the bottom surface. A read or write operation on the internal memory device is performed through the terminal portion 2.

The body is formed with a cut portion 3 at the top-left corner (in the plan view). The cut portion 3 is formed to prevent the plate-like memory 1 from being mounted in, for example, an attachment/detachment mechanism of the drive apparatus main body side in an erroneous insertion direction.

To improve the ease of use, the bottom surface of the body is formed with a projection/recess portion 4 for slip prevention. The bottom surface is also formed with a slide switch 5 for preventing erroneous erasure of recorded contents.

In the plate-like memory 1 having the above structure, it is prescribed that the flash memory capacity is one of 4 MB (megabytes), 8 MB, 16 MB, 32 MB, 64 MB, and 128 MB.

What is called a FAT (file allocation table) system is used as a file system for data recording and reproduction.

2. Configuration of Drive Apparatus

The configuration of a drive apparatus 20 according to the embodiment which can perform recording and reproducing operations on the above plate-like memory 1 will be described with reference to FIGS. 2A-2E and 3.

A variety of main data can be handled by the drive apparatus 20 as a subject of writing or reading on the plate-like memory 1. Examples of such main data are moving picture data, still picture data, voice data, audio data of a CD or the like, and control data.

As described later, in the system according to the embodiments, the drive apparatus 20 is a section that codes data at the time of copying or movement and performs decoding at the time of reproduction.

FIGS. 2A-2E are a plan view, a top view, a left-hand side view, a right-hand side view, and a bottom view of an example appearance of the drive apparatus 20.

For example, the drive apparatus 20 is made small and light so that a user can carry it easily.

As shown in FIG. 2B, the plate-like memory 1 is mounted in an attachment/detachment mechanism 22 that is formed in the top portion of the drive apparatus 20. The drive apparatus 20 records or reproduces various data such as musical data, voice data, moving image data, still image data, computer data, and control data to or from the plate-like memory 1.

The front surface of the drive apparatus 20 is formed with a display section 21 such as a liquid display panel where a reproduced image or characters, information associated with a reproduced voice or music, a manipulation guide message, or the like is displayed.

Various terminals are formed for connection to various apparatuses (described later).

For example, as shown in FIG. 2B, the top surface is formed with a headphone terminal 23 and a microphone input terminal 25. When a headphone is connected to the headphone terminal 23, a reproduction audio signal is supplied to the headphone and a user can listen to a reproduction audio output. When a microphone audio output is connected to the microphone input terminal 25, the drive apparatus 20 can capture a voice signal collected by the microphone and record it in the plate-like memory 1, for example.

As shown in FIG. 2D, the right-hand side surface of the body is formed with a line output terminal 24, a line input terminal 26, a digital input terminal 27, etc.

When an external apparatus is connected to the line output terminal 24 via an audio cable, a reproduction audio signal can be supplied to the external apparatus. For example, when an audio amplifier is connected to the line output terminal 24, a user can listen to music or voice, with a speaker system, that is reproduced from the plate-like memory 1. Alternatively, when a Mini disc recorder or a tape recorder is connected to the line output terminal 24, music or voice that is reproduced from the plate-like memory 1 can be dubbed to another medium.

When an external apparatus is connected to the line input terminal 26, it becomes possible to capture an audio signal that is supplied from the external apparatus such as a CD player and record it in the plate-like memory 1, for example.

Further, digital audio data that is transmitted via an optical cable can be input through the digital input terminal 27. For example, if an external CD player or the like is capable of outputting digital data, what is called digital dubbing is enabled by connecting it to the digital input terminal 27 via an optical cable.

For example, as shown in FIG. 2C, the left-hand side surface of the drive apparatus 20 is formed with a USB (universal serial bus) connector 28, a power terminal 29, etc.

The USB connector 28 enables various kinds of communication and data transmission with USB-conformable apparatuses such as a personal computer having a USB interface.

The drive apparatus 20 according to the embodiment holds, for example, a dry cell or a rechargeable battery inside as an operation power source. Operation power can also be obtained from an external commercial AC line by connecting an AC adaptor to the power terminal 29.

The above-described kinds, number, and arrangement positions of terminals are just examples and terminals may be provided in different manners than described above.

For example, a digital output terminal capable of accommodating an optical cable may be provided. Further, a SCSI connector, a serial port, an RS-232C connector, an IEEE connector, etc. may be formed.

No description is made of terminal structures because they are known. However, it is noted that it is possible to commonize the above-mentioned headphone terminal 23 and line output terminal 24 into a single terminal, or commonize those terminals 23 and 24 with a digital output terminal. Similarly, it is possible to commonize the microphone input terminal 25, the line input terminal 26, and the digital input terminal 27 into a single terminal.

The drive apparatus 20 is provided with manipulators to be used by a user, such as a manipulation lever 31, a stop key 23, a record key 33, a menu key 34, a volume-up key 35, a volume-down key 36, and a hold key 37.

The manipulation lever 31 is a manipulator that can be turned at least in the vertical direction; it may further be made depressible. Manipulation modes of the manipulation lever 31 enable a manipulation for reproducing musical data or the like, an REW and AMS manipulation (fast rewind/head search), an FF and AMS manipulation (fast feed/head search), etc.

The stop key 32 is a key for ordering a stop of a reproducing or recording operation of musical data or the like. The record key 33 is a key for ordering a recording operation of musical data or the like. The menu key 34 is a key to be used for editing of musical data or the like and mode setting. The volume-up key 35 and the volume-down key 36 are keys for ordering increase and decrease, respectively, of the output sound volume in reproduction of musical data or the like.

The hold key 37 is a key for enabling or disabling the manipulation-receiving functions of the respective keys. For example, the manipulation-receiving functions of the respective keys are disabled by the hold key 37 when there is a possibility that a key is depressed inadvertently during carriage and an erroneous operation is thereby caused.

Naturally, the above manipulation keys are just examples. Other manipulators such as a cursor movement key, numeral keys, and a manipulation dial such as a JOG dial may be provided.

A power-on/off key was not described above. It is possible to dispense with a power key by making the manipulation lever 31, for example, serve also as a power-on key and providing a process of turning off the power if a prescribed time has elapsed from a manipulation on the stop key 32. Naturally, a power key may be provided.

The number, kinds, positions of manipulators provided may be determined in a wide variety of manners. However, by preparing a minimum necessary number of, manipulators in the manner shown in FIGS. 2A-2E, the number of keys is decreased and hence the size and the cost of the apparatus are reduced and the ease of operation is improved.

Figure 3:
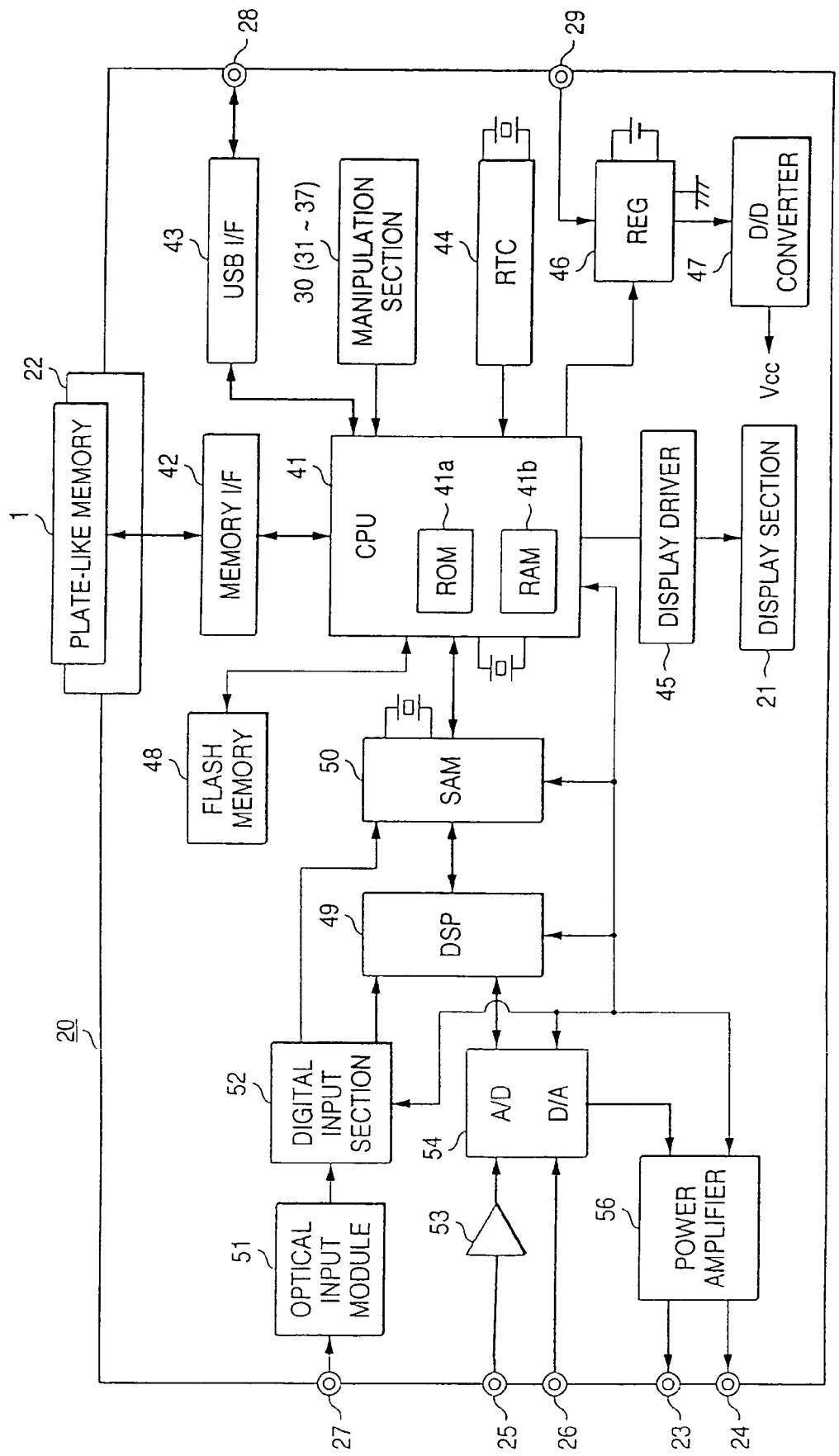
FIG. 3 is a block diagram of the drive apparatus according to the first embodiment.

FIG. 3 shows the internal configuration of the drive apparatus 20.

A CPU 41, which is a central control section of the drive apparatus 20, controls the operations of the respective sections described below.

A ROM 41a storing, for example, an operation program and various constants and a RAM 41b as a work area are provided in the CPU 41.

A manipulation section 30 corresponds to the various manipulators 31-37 described above. The CPU 41 performs a control operation that is prescribed by the operation program in accordance with manipulation input information supplied from the manipulation section 30.

A flash memory 48 is also provided. The CPU 41 can store, in the flash memory 48, system setting information relating to various operations such as a music recording mode, a reproduction volume, and a display mode, and other information.

In particular, in this embodiment, a terminal key as an identifier is set in the form of a code that is different from one drive apparatus 20 to another. The terminal key is held by the flash memory 48.

By giving a SAM 50 (described later) the terminal key that is read out from the flash memory 48, the CPU 41 causes the SAM 50 to perform coding or decoding.

A real time clock 44, which is what is called a clock section, keeps time to indicate the current date and time. The CPU 41 can check the current date and time based on date/time data that is supplied from the real time clock 44.

A USB interface 43 is a communication interface with an external apparatus that is connected to the USB connector 28. The CPU 41 can perform data communication with an external personal computer or the like via the USB interface 43. For example, control data, computer data, image data, audio data, or the like is transmitted or received.

A regulator 46 and a DC/DC converter 47 are provided as power sections. When the power is to be turned on, the CPU 41 instructs the regulator 46 to turn on the power. In response to the instruction, the regulator 46 starts supply of power from a battery (a dry cell or rechargeable battery). Alternatively, where an AC adaptor is connected to the power terminal 29, the regulator 46 starts supply of power from the AC adaptor.

A power source voltage that is output from the regulator 46 is converted by the DC/DC converter 47 into a prescribed voltage value, which is supplied to the individual blocks as an operation power source voltage Vcc.

When the plate-like memory 1 is mounted in the attachment/detachment mechanism 22, the CPU 41 can access the plate-like memory 1 via a memory interface 42 and hence can perform recording, reproduction, editing, or the like of various data.

By controlling a display driver 45, the CPU 41 can cause the display section 21 to display a prescribed image. For example, a menu or a guide for manipulation by a user, the contents of files that are recorded in the plate-like memory 1, or like information is displayed. For example, where image data of a moving picture or a still picture is recorded in the plate-like memory 1, the image data can be read out and displayed on the display section 21.

As described above, in the embodiment, the digital input terminal 27, the microphone input terminal 25, the line input terminal 26, the headphone terminal 23, and the line output terminal 24 are formed for input/output of a musical signal or a voice signal as an audio signal.

The SAM (security application module: coding/expansion processing section) 50, a DSP (digital signal processor) 49, an analog-to-digital/digital-to-analog conversion section (ADDA conversion section) 54, a power amplifier 56, a microphone amplifier 53, an optical input module 51, and a digital input section 52 are provided as an audio signal processing system for the above terminals.

The SAM 50 performs coding or decoding of data that is exchanged between the CPU 41 and the DSP 49 as well as exchanges, with the CPU 41, the encryption key that is an identifier and also called a terminal key. That is, the SAM 50 performs coding and decoding by using the terminal key.

The coding and decoding by the SAM 50 may be enabled for data other than musical data.

The DSP 49 compresses or expands audio data based on a command supplied from the CPU 41.

The digital input section 52 performs input interface processing on digital audio data that is captured by the optical input module 51.

The ADDA conversion section 54 performs A/D conversion or D/A conversion on an audio signal.

An audio signal is input or output in the following manner by the above blocks.

A signal that has been supplied as digital audio data from an external apparatus to the digital input terminal 27 via an optical cable is photoelectrically converted and captured by the optical input module 51, and then subjected to a receiving operation in the digital input section 52 according to a transmission format. The digital audio data thus received and extracted is compressed by the DSP 49, supplied to the CPU 41, and then made data to be recorded in the plate-like memory 1, for example.

When a microphone is connected to the microphone input terminal 25, an input audio signal is amplified by the microphone amplifier 53, A/D-converted by the ADDA conversion section 54, and then supplied to the DSP 49 as digital audio data. The digital audio data is compressed by the DSP 49, supplied to the CPU 41, and then made data to be recorded in the plate-like memory 1, for example.

An input audio signal coming from an external apparatus that is connected to the line input terminal 26 is A/D-converted by the ADDA conversion section 54 and then supplied to the DSP 49 as digital audio data. The digital audio data is compressed by the DSP 49, supplied to the CPU 41, and then made data to be recorded in the plate-like memory 1, for example.

On the other hand, when audio data that is read out from the plate-like memory 1, for example, is to be output, the CPU 41 causes the DSP 49 to expand the audio data. The digital audio data thus processed is converted into an analog audio signal by the ADDA conversion section 54 and then supplied to the power amplifier 56. The power amplifier 56 performs amplification for supply to a headphone or line output and supplies an amplified signal to the headphone terminal 23 or the line output terminal 24.

As described later, the drive apparatus 20 can causes the USB interface 43 to supply audio data as compressed data that is read out from the plate-like memory 1 or audio data that is captured via the digital input terminal 27, the microphone input terminal 25, or the line input terminal 26 and then compressed to an external apparatus such as a personal computer via the USB terminal 28 after coding it with the SAM 50.

Further, the drive apparatus 20 can supply audio data that was captured from an external apparatus that is connected to the USB terminal 28 back to the external apparatus via the USB terminal 28 after coding it with the SAM 50.

Each of the above operations is performed in copying or moving audio data, an example of which is an operation that is performed in recording coded audio data in the HDD or the like of a personal computer as an external apparatus (described later in detail).

For example, as described later, in reproducing data that was copied or moved in the above manner, reproduced coded data is input to the drive apparatus 20 via the USB interface 53. In this case, the CPU 41 causes the SAM 50 to decode the audio data. The decoded audio data is recorded in the plate-like memory 1, output from the headphone terminal 23 or the line output terminal 24 after being expanded by the DSP 49, or transmitted to an external apparatus such as a personal computer via the USB interface 43.

The configuration of the drive apparatus 20 shown in FIG. 3 is just an example and the invention is not limited to it.

For example, it is conceivable to incorporate a speaker for output of audio data and perform audio output by supplying an output of the power amplifier 56 to the speaker.

In the embodiment, in the following description of copying and movement operations, audio data is used as an example of main data that is a subject of a copying or movement operation. However, as described above, the drive apparatus 20 can deal with not only audio data but also other various data, to which the copying and movement operations that will be described bellow can also be applied.

3. Example of System Connection

Figure 4:
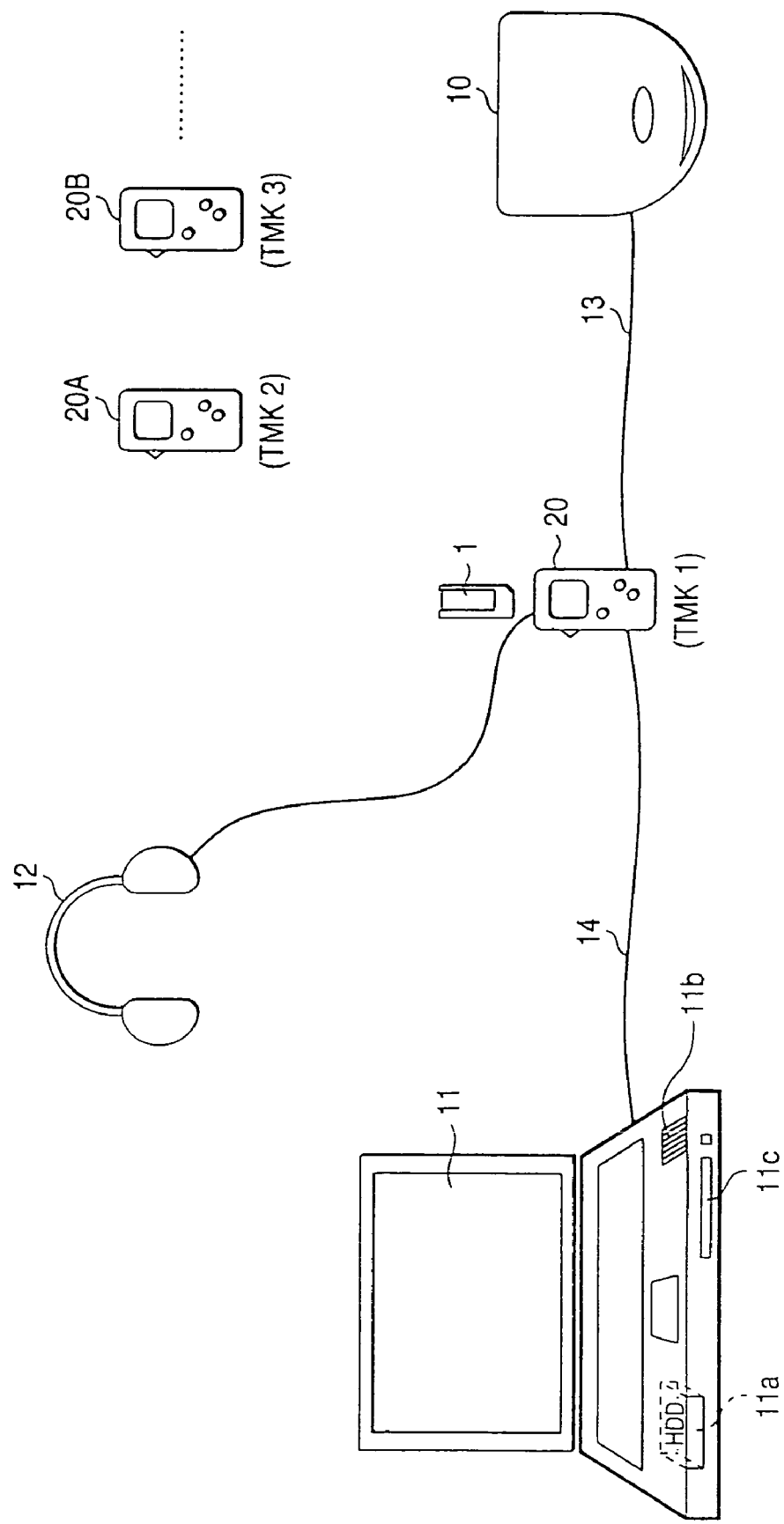
FIG. 4 shows an example of connection of a system including the drive apparatus according to the first embodiment of the invention.

FIG. 4 shows an example of system connection in which the drive apparatus 20 serves as the center.

A system according to the invention is constructed in such a manner that at least the drive apparatus 20 and a personal computer 11 are connected to each other so as to be able to communicate with each other. A variety of operations can be realized by connecting other various apparatuses to the system.

As described above, when mounted with a plate-like memory 1, the drive apparatus 20 can record or reproduce data to or from the plate-like memory 1.

For example, when a plate-like memory 1 in which musical data is recorded is mounted in the drive apparatus 20, a user can enjoy reproduced music by connecting a headphone 12 to the drive apparatus 20 as shown in FIG. 4.

When a CD player 10, for example, as an external reproducing apparatus is connected to the line input terminal 26 or the digital input terminal 27 via a cable 13, the drive apparatus 20 can capture a reproduction audio signal from the CD player 10 and record it in the plate-like memory 1.

Although not shown in FIG. 4, it is also possible to connect a microphone to the drive apparatus 20 and record a collected voice in the plate-like memory 1, or to connect a recording apparatus such as an MD recorder to the drive apparatus 20, supply data to the recording apparatus, and record the data on a recording medium that is mounted in the recording apparatus.

When the drive apparatus 20 is connected to an information apparatus such as the personal computer 11 via a USB (universal serial bus) cable 14, it is possible to record data supplied from the personal computer 11 in the plate-like memory 1 or transfer data reproduced from the plate-like memory 1 to the personal computer 11 for copying or movement. For example, the destination of copying or movement is an HDD 11a in the personal computer 11.

A speaker 11b and a CD-ROM drive 11c are shown in the personal computer 11. Operations using those components will be described later.

As described above, when connected to one of various apparatuses, the drive apparatus 20 makes it possible to perform recording or reproduction in a state also suitable for carriage. Or a system operation can be performed when the drive apparatus 20 is connected to an apparatus that is installed in a home or at a place of work.

The drive apparatus 20 of the embodiment has the display section 21. By using the display section 21, the drive apparatus 20 can reproduce, by itself, document data, image data, or the like recorded in the plate-like memory 1.

Although not provided in the above-described drive apparatus 20 of the embodiment, if a built-in microphone or speaker is provided, the drive apparatus 20 can reproduce or record, by itself, music, voice, or a moving picture from or in the plate-like memory 1.

Further, although in this embodiment the plate-like memory 1 is mounted in the drive apparatus 20 in a detachable manner, another configuration is possible in which a built-in nonvolatile memory such as a flash memory (the plate-like memory 1 also uses a flash memory) is provided inside the drive apparatus 20 and audio data or the like to be recorded or reproduced is stored in the built-in nonvolatile memory.

As described above, a variety of modes of use of the drive apparatus 20 can be realized such as independent use and a system operation in which the drive apparatus 20 is connected to the personal computer 11 or the like.

Incidentally, a statement was made above to the effect that the terminal key unique to the drive apparatus 20 is stored in the flash memory 48. For example, as shown in FIG. 4, drive apparatuses 20, 20A, 20B, . . . store respective terminal keys TMK1, TMK2, TMK3, . . . as different code numbers.

4. Data Recording, Reproducing, Copying, and Moving Operations (1)-(8)

Figure 5:
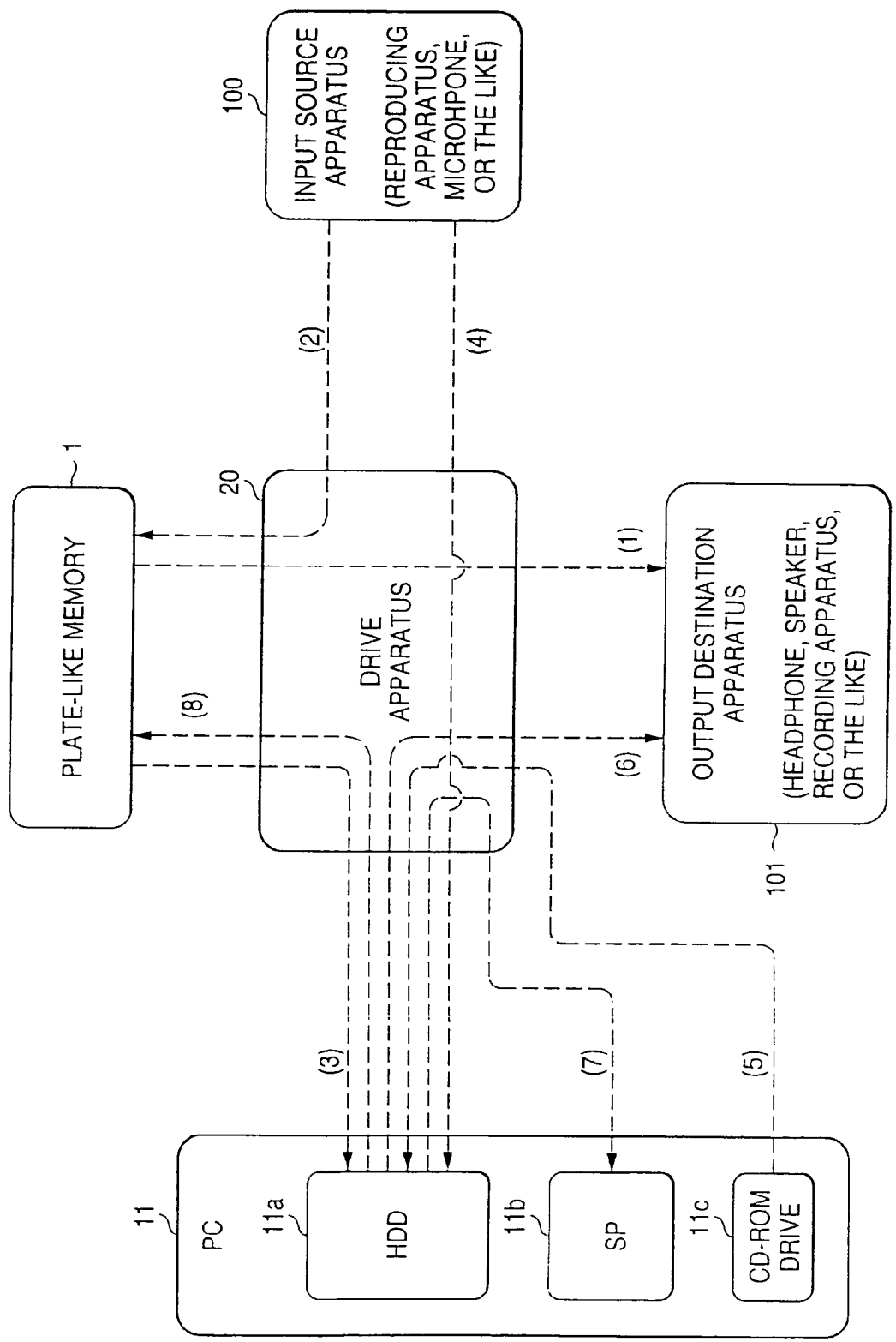
FIG. 5 shows data flows in recording, reproducing, copying, and moving operations according to the first embodiment.

FIG. 5 schematically shows, as operations (1)-(8), data flows in various operation examples of recording, reproduction, copying, and movement on main data such as audio data in the drive apparatus 20 of the embodiment or a system in which the drive apparatus 20 is connected to another apparatus.

FIG. 5, which includes the plate-like memory 1, the drive apparatus 20, the personal computer 11, an input source apparatus 100, and an output destination apparatus 101, shows data flows.

The input source apparatus 100 is an apparatus other than the personal computer 11 and the plate-like memory 1 that is connected to the drive apparatus 20 and supplies audio data to the drive apparatus 20. For example, the input source apparatus 100 is a reproducing apparatus such as a CD player 10 shown in FIG. 4 or a microphone to be connected to the microphone input terminal 25 of the drive apparatus 20.

The output destination apparatus 101 is an apparatus other than the personal computer 11 and the plate-like memory 1 that is connected to the drive apparatus 20 and supplied with audio data by the drive apparatus 20. For example, the output destination apparatus 101 is the headphone 12 shown in FIG. 4, a speaker system (not shown), or a recording apparatus such as an. MD recorder.

Operation (1) is a reproducing operation on the plate-like memory 1 that is performed by the drive apparatus 20, that is, an operation that the drive apparatus 20 reads out an audio data file that is recorded in the mounted plate-like memory 1 and the output destination apparatus 101 outputs it as an audio output. To this end, as described above the drive apparatus 20 reads out audio data via the memory interface 42 and outputs it to the output destination apparatus 101 via the headphone terminal 23 or the line output terminal 24 after subjecting it to processing in the DSP 49, the ADDA conversion section 54, and the power amplifier 56.

Operation (2) is a recording operation on the plate-like memory 1 that is performed by the drive apparatus 20, that is, an operation that the drive apparatus 20 records audio data supplied from the input source apparatus 100 in the mounted plate-like memory 1. To this end, as described above, the drive apparatus 20 writes audio data that is input via the microphone input terminal 25, the line input terminal 26, or the digital input terminal 27 and then compressed by the DSP 49 to the plate-like memory 1 via the memory interface 42.

Operations (3), (4), and (5) are operations that audio data is recorded in the HDD 11a of the personal computer 11.

First, operation (3) is an operation that audio data recorded in the plate-like memory 1 is copied or moved to the HDD 11a.

In this case, the drive apparatus 20 reads out an audio data file recorded in the mounted plate-like memory 1 via the memory interface 42 and codes the data with the SAM 50. The drive apparatus 20 supplies the coded audio data to the personal computer 11 via the USB interface 43. The personal computer 11 records the received coded audio data in the HDD 11a.

Operation (4) is an operation that audio data recorded on a recording medium such as a CD that is mounted in a CD player as the input source apparatus 100 is copied or moved to the HDD 11a.

In this case, the drive apparatus 20 causes the SAM 50 to code audio data that is input via, for example, the microphone input terminal 25, the line input terminal 26, or the digital input terminal 27 and then compressed by the DSP 49. The drive apparatus 20 supplies the coded audio data to the personal computer 11 via the USB interface 43. The personal computer 11 records the received coded audio data in the HDD 11a.

Operation (5) is an operation that audio data recorded on a recording medium such as a CD or a CD-ROM that is mounted in another reproducing apparatus such as a CD-ROM drive 11c incorporated in the personal computer 11 is copied or moved to the HDD 11a.

In this case, the drive apparatus 20 captures, via the USB interface 43, audio data that is reproduced by the CD-ROM drive 11c in the personal computer 11 and then transmitted, and then causes the SAM 50 to code the captured audio data. The drive apparatus 20 supplies the coded audio data to the personal computer 11 via the USB interface 43. The personal computer 11 records the received coded audio data in the HDD 11a.

Operations (6), (7), and (8) are operations of reproducing audio data from the HDD 11a that is performed by the personal computer 11, that is, operations of reproducing coded audio data that was recorded by one of the above operations (3), (4), and (5).

Operation (6) is an operation of reproducing and outputting coded audio data that is read out from the HDD 11a from the output destination apparatus 101 via the drive apparatus 20.

In this case, the drive apparatus 20 captures, via the USB interface 43, audio data reproduced from the HDD 11a in the personal computer 11 and then transmitted and causes the SAM 50 to decode the audio data. The drive apparatus 20 outputs the decoded audio data to the output destination apparatus 101 from the headphone terminal 23 or the line output terminal 24 after subjecting it to processing by the DSP 49, the ADDA conversion section 54, and the power amplifier 56.

Operation (7) is an operation of reproducing and outputting coded audio data that is read out from the HDD 11a from the speaker 116 of the personal computer 11 via the drive apparatus 20.

In this case, the drive apparatus 20 captures, via the USB interface 43, audio data reproduced from the HDD 11a in the personal computer 11 and then transmitted and causes the SAM 50 to decode the audio data. The drive apparatus 20 causes the DSP 49 to expand the decoded audio data and transmits the expanded audio data to the personal computer 11 via the USB interface 43. The personal computer 11 reproduces and outputs the audio data thus received from the speaker 11b.

If the personal computer 11 side has the expansion function of the DSP 49, the personal computer 11 side may perform the expansion.

Operation (8) is an operation that the drive apparatus 20 records, in the plate-like memory 1, coded audio data that is readout from the HDD 11a. That is, operation (8) is a copying or movement operation in the reverse direction to that as the above-described operation (3). For example, in operation (8), audio data that was moved from the plate-like memory 1 to the HDD 11a by operation (3) is moved to the plate-like memory 1 to restore the original state.

In this case, the drive apparatus 20 captures, via the USB interface 43, audio data reproduced from the HDD 11a in the personal computer 11 and then transmitted and causes the SAM 50 to decode the audio data. The drive apparatus 20 writes the decoded audio data to the plate-like memory 1 via the memory interface 42.

Although classification into operations (1)-(8) has been made above for the sake of convenience of description, copying and movement operations as system operations of the embodiment, that is, operations involving coding or decoding using the terminal key of the drive apparatus 20 are operations (3)-(8).

Figure 6:
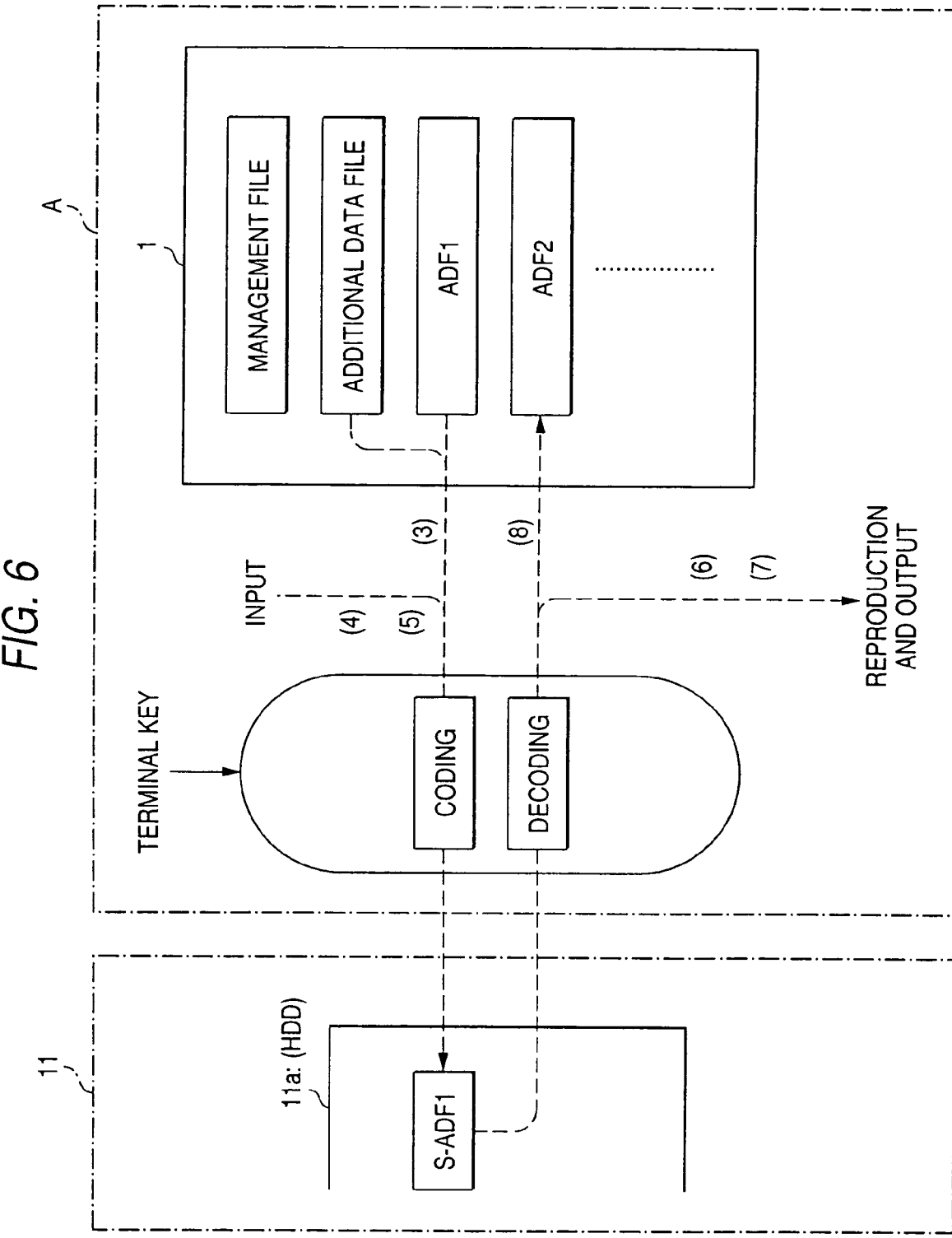
FIG. 6 shows copying and movement operations according to the first embodiment.

FIG. 6 is a schematic diagram showing those copying and movement operations.

For example, as shown in FIG. 6, files ADF1, ADF2, . . . of music data or the like as audio data are recorded in the plate-like memory 1.

A management file for managing those files is also recorded. The management file manages addresses as pointer information, file numbers, file names, file lengths of the respective audio data files ADF1, ADF2, . . .

An additional data file containing additional data of the respective audio data files ADF1, ADF2, . . . may also be recorded. The additional data is information associated with a song, such as a song name, an artist name, words, and a message.

To copy, for example, the audio data file ADF1 from the plate-like memory 1 by the above-described operation (3), as shown in FIG. 6, audio data that is read out as the audio data file ADF1 is coded by using the terminal key and a resulting data file S-ADF1 of coded audio data is written to the HDD 11a. The additional data relating to the audio data file ADF1 may also be read out and recorded in the HDD 11a side. By not coding the additional data, the-song name etc. of audio data that has been copied to the HDD 11a can be displayed to a user on the personal computer 11 side, for example.

Audio data that is input by operation (4) or (5) is also recorded in the HDD 11a after being coded.

Although the personal computer 11 can ordinarily handle the file itself of the coded audio data file S-ADF1 that is recorded in the HDD 11a, actually the personal computer 11 cannot reproduce it as it is.

For example, since the personal computer 11 handles the coded audio data file S-ADF1 as a one ordinary file recorded in the HDD 11a, the personal computer 11 can copy or move it to another recording medium such as another HDD, a floppy disc, or a magneto-optical disc or transmit it as communication data.

However, since the audio data itself is coded and the terminal key that is necessary for decoding it is recognized by only the drive apparatus 20 that coded it, neither the personal computer 11 nor other apparatuses cannot decode it by themselves. Therefore, even if the audio data is output as reproduction audio, the reproduction audio is not recognizable.

Therefore, to reproduce the coded audio data file S-ADF1, it is necessary to connect the drive apparatus 20 that was used in the previous copying or movement operation to the personal computer 11.

In this state, as described above as operation (6), (7), or (8), the coded audio data file S-ADF1 that is read out from the HDD 11a is transmitted to the drive apparatus 20 and the drive apparatus 20 decodes it by using the terminal key into decoded audio data, which is reproduced and output or recorded in the plate-like memory 1 as shown in FIG. 6.

As described above in connection with FIG. 4, the drive apparatus 20 has its own code as a terminal key. That is, other drive apparatuses 20 have different code numbers as terminal keys.

Therefore, a certain drive apparatus 20 can decode only data that was coded by the same drive apparatus 20 and then copied or moved.

In other words, the coded audio data file S-ADF1 that is recorded in the HDD 11a can be reproduced by only the user himself who owns the drive apparatus 20 that recorded the file S-ADF1 by a copying or movement operation.

This means that copied or moved main data can be used, that is, reproduced, only within the confines of personal duplication by a user, and hence copyright infringement of musical data etc. can be prevented very effectively.

On the other hand, as described above, a user is free to copy the coded audio data file S-ADF1 itself to another recording medium or transmit it. And the user himself can reproduce the audio data by connecting his own drive apparatus 20 to the drive of the recording medium or a transmission destination apparatus.

That is, various forms of data use and data carriage are enabled within the confines of personal use of a user, whereby the ease of use of the user can be improved.

Further, for example, data that is high in secrecy to a user is not reproducible by persons other than the user himself, that is, the person who owns the drive apparatus 20. Therefore, a secrecy protection effect can be obtained as well as the copyright protection effect.

The terminal key that is used for coding or decoding audio data is stored in the drive apparatus 20 and coding or decoding is necessarily performed in the drive apparatus 20. That is, the terminal key is not transferred to another apparatus at the time of a copying or movement operation. Further, at other time points, there is no necessity for transmitting the terminal key to the outside of the drive apparatus 20.

This means that the terminal key does not go out of the drive apparatus 20 at all. It is impossible to steal the code number of the terminal key in a communication process or to make the terminal key usable in a copying or movement destination apparatus. Thus, the security against decoding is very high.

5. Operations Involving Recording in HDD

Example processes of the above-described operations (3)-(8) will be described below. First, operations (3), (4), and (5) will be described here as operations involving recording in the HDD 11a.

5-1 Operation (3)

As operation (3), an operation of copying or moving main data such as an audio data file recorded in the plate-like memory 1 to the HDD 11a of the personal computer 11, will be described with reference to FIGS. 7 and 8.

Figure 7:
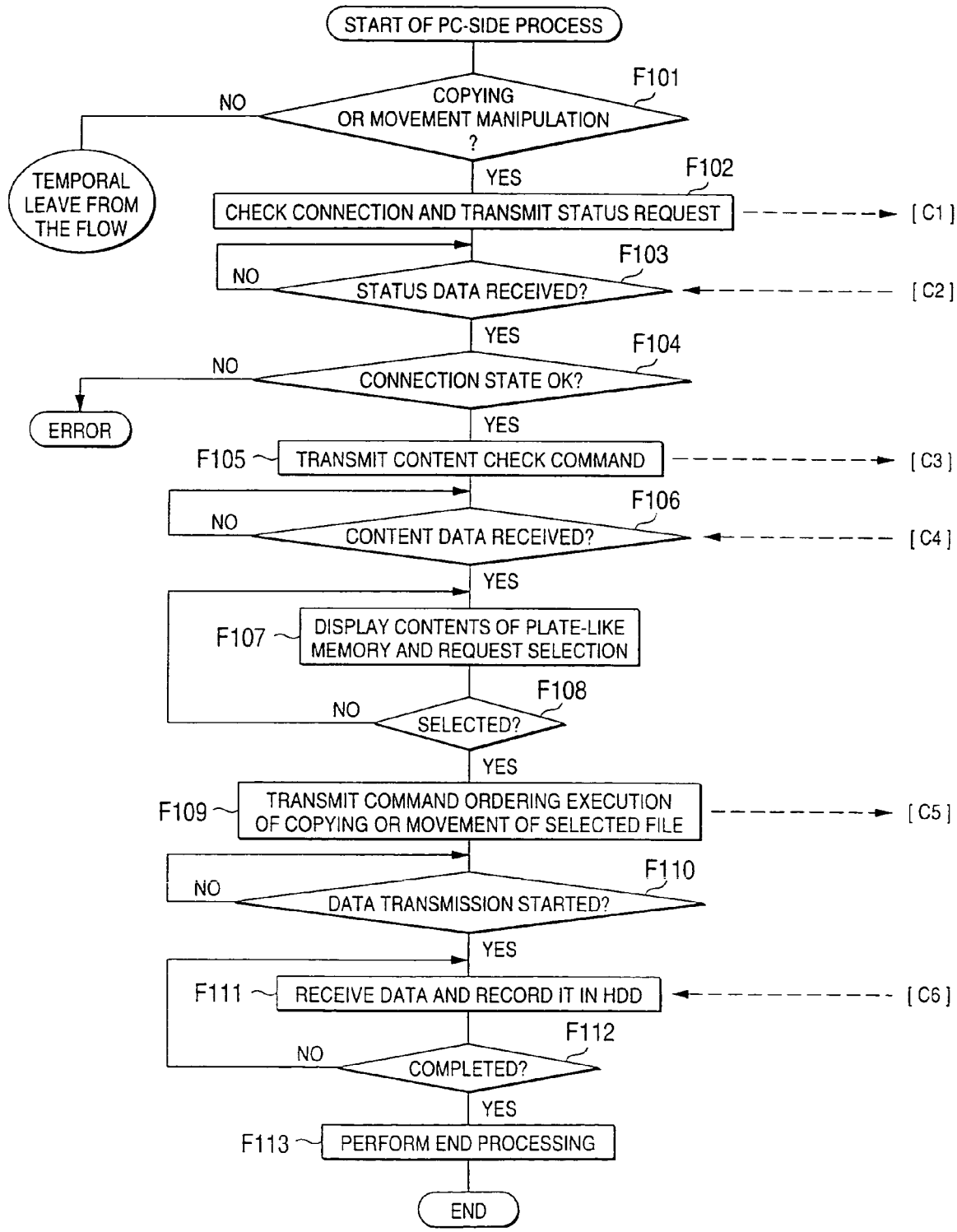
FIG. 7 is a flowchart showing a process on the personal computer side of operation (3) according to the first embodiment.
Figure 8:
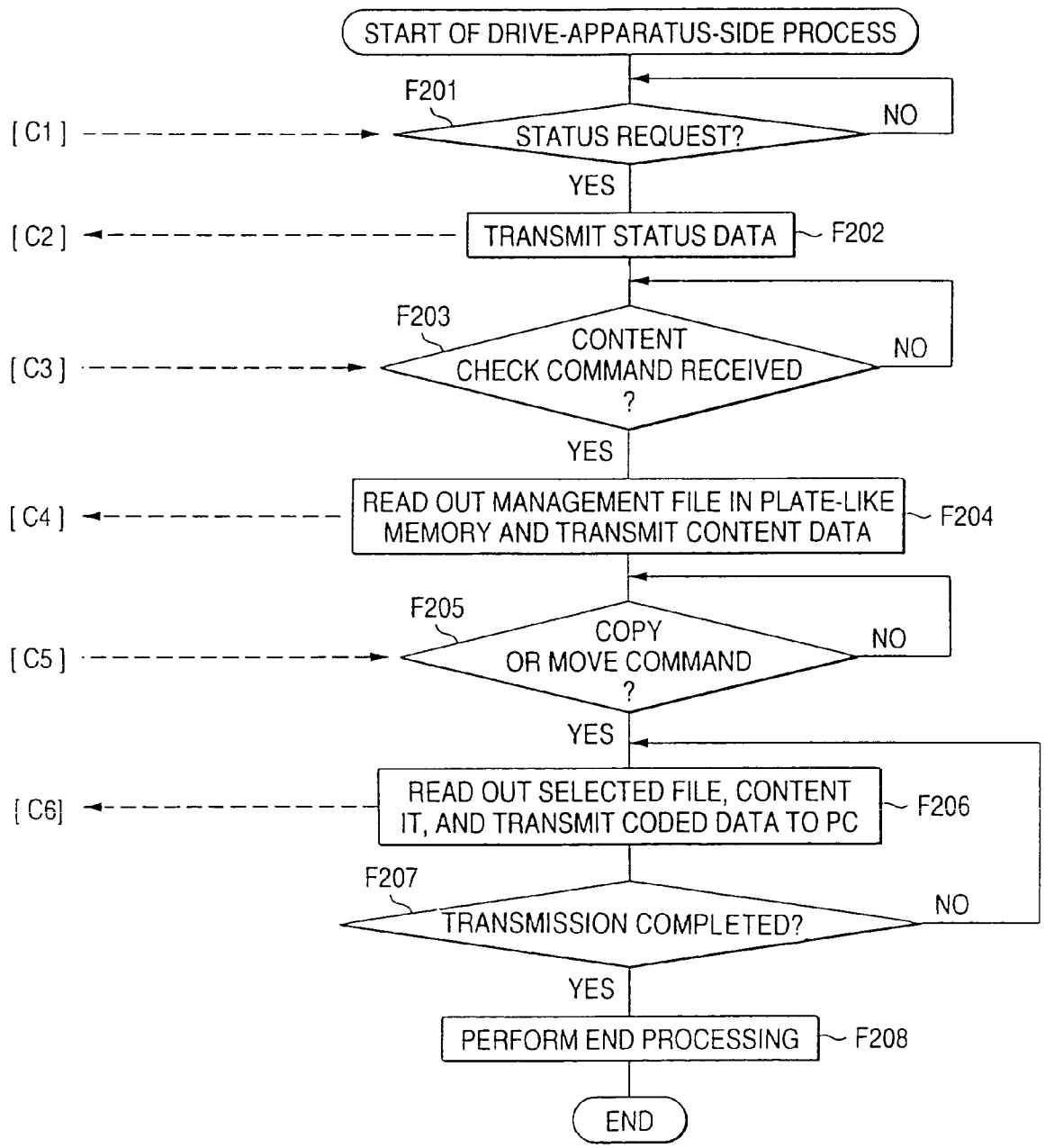
FIG. 8 is a flowchart showing a process on the drive apparatus side of operation (3) according to the first embodiment.

FIG. 7 shows a process on the personal computer 11 side and FIG. 8 shows a process that is executed by the CPU 41 of the drive apparatus 20.

As described above, a copying or movement operation as operation (3) is performed in a state that the drive apparatus 20 is connected to the personal computer 11. In this state, a user causes a copying or movement operation by performing manipulations using, for example, the personal computer 11 side (e.g., manipulations using input devices of the personal computer 11 such as a keyboard and a mouse (not shown)).

When the user has performed manipulations for copying or movement on the personal computer 11, the process of the personal computer 11 proceeds from step F101 to step F102 (see FIG. 7). At step F102, first the personal computer 11 checks whether the drive apparatus 20 is connected to it.

Specifically, the personal computer 11 transmits a status request command (communication C1) to the CPU 41 of the drive apparatus 20 via the USB interface. At step F103, the personal computer 11 waits for a status reply (communication C2).

When the CPU 41 of the drive apparatus 20 receives the status request command (communication C1), the process proceeds from step F201 to step F202 (see FIG. 8). At step F202, the CPU 41 causes transmission of data indicating a current status. Specifically, the data indicates whether a plate-like memory 1 is mounted in the drive apparatus 20 and whether a state has been established that audio data or the like can be read out from the plate-like memory 1 and read-out data can be transmitted to the personal computer 11.

When the personal computer 11 receives the status data at step F103 in FIG. 7, at step F104 the personal computer 11 checks the status content and checks whether a proper connection state for copying or movement is established.

Although not shown in FIGS. 7 and 8 in detail, if no status data is received from the drive apparatus 20 in response to the status request command for a prescribed time or more, or if it is detected that the terminal state of the USB connector (e.g., the voltages of the respective terminals) is a disconnection state, the personal computer 11 judges that the drive apparatus 20 is not connected to it and error termination is made after execution of step F104.

Error termination is also made when status data is received from the drive apparatus 20 but it indicates an improper state. Examples are such that the plate-like memory 1 is not mounted in the drive apparatus 20 and that the drive apparatus 20 is performing another recording operation, in which cases the drive apparatus 20 cannot deal with a copying or movement operation.

When it has been confirmed by the status check that a proper connection state is established, the process of the personal computer 11 goes to step F105, where the personal computer 11 transmits a content check command (communication C3) to the CPU 41. At step F106, the personal computer 11 waits for a reply (communication C4) to the content check command.

When the content check command (communication C3) is received, the process of the CPU 41 goes from step F203 to step F204 (see FIG. 8). At step F204, the CPU 41 reads out the management file of audio data files or the like stored in the plate-like memory 1 via the memory interface 42 and checks the main data (e.g., audio data) stored in the plate-like memory 1. For example, the CPU 41 captures song names of the audio data. The CPU 41 generates content data as a list of the song names etc. and transmits the content data (communication C4) to the personal computer 11.

When the personal computer 11 receives the content data, the process goes to step F107 in FIG. 7, where the personal computer 11 displays a list of song names that can be copied or moved on the display screen based on the content data, as well as a request for selection of a song to be copied or moved.

In response, the user performs a manipulation for selecting a song. In response to the manipulation for selection, the process of the personal computer 11 goes from step F108 to step F109, where the personal computer 11 transmits, to the CPU 41, a command (communication C5) instructing the CPU 41 to perform copying or movement of a song as the selected file.

At step F110, the personal computer 11 waits for a start of data transmission from the drive apparatus 20.

When the CPU 41 receives the command (communication C5) instructing the CPU 41 to perform copying or movement, the process goes from step F205 to step F206, where the audio data as the selected file is read out from the plate-like memory 1 and then transmitted.

Specifically, as described above, the CPU 41 starts readout of the subject audio data file via the memory interface 42. In advance, the CPU 41 reads out the terminal key from the flash memory 48 and transfers it to the SAM 50. The CPU 41 causes audio data that is read out from the plate-like memory 1 to be transferred to the SAM 50 by a prescribed amount each time and causes the SAM to code it using the terminal key.

The CPU 41 causes coded audio data produced by the SAM 50 through coding to be transferred to the USB interface 43, which transmits the coded audio data (communication C6) to the personal computer 11.

When the transmission of the above coded audio data is started on the drive apparatus 20 side, the process of the personal computer 11 goes to step F111 in FIG. 7, where the personal computer 11 receives the transmitted data and writes it to the HDD 11a.

The coded audio data is written to the HDD 11a by execution of step F206 by the CPU 41 and step F111 by the personal computer 11.

After completion of the readout from the plate-like memory 1, coding, and transmission of the audio data as the subject of copying or movement, the process of the CPU 41 goes from step F207 to step F208, where end processing is performed. Then, the execution of the series of steps is finished.

After completion of the writing of the transmitted coded audio data, the process of the personal computer 11 goes from step F112 to step F113, where end processing is performed. Then, the execution of the series of steps is finished.

Examples of the end processing at steps F113 and F208 are the CPU 41's transmitting, to the personal computer 11, status data indicating completion of the transmission, the personal computer 11's reporting normal completion of the writing to the HDD 11a, and the personal computer 11's updating the directories of the HDD 11a. When the operation performed was movement rather than copying, the CPU 41 erases the audio data as the subject of the movement operation from the plate-like memory 1.

The copying or movement operation as operation (3) is realized by the above-described processes of FIGS. 7 and 8. That is, an operation of coding main data in the plate-like memory 1 and storing resulting coded main data in the HDD 11a is performed.

5-2 Operation (4)

Next, operation (4) will be described, which is an operation of copying or moving main data from the input source apparatus 100 (see FIG. 5) to the HDD 11a via the drive apparatus 20. The drive apparatus 20 performs intermediary processing.

However, copying or movement is performed after the connection state between the personal computer 11 and the drive apparatus 20 is checked by basically the same processing as shown in FIGS. 7 and 8.

For example, if a system is constructed in which the personal computer 11 and the drive apparatus 20 can perform data communication with a CD player or the like as the input source apparatus 100, steps F105-F108 in FIG. 7 and steps F203-F204 in FIG. 8 are rendered executable. The CPU 41 receives information of the contents of recorded songs from a CD player or the like and the personal computer 11 side displays it in the form of a list to allow selection by a user.

However, if data communication cannot be performed as in a case where a CD player or the like is connected to the drive apparatus 20 merely by an audio cable, a song that the user causes the CD player to reproduce is made a subject of copying or movement.

Steps F109-F113 in FIG. 7 and steps F205-F208 in FIG. 8 may also be executed in this case. However, operation (4) is different from the above-described operation (3) in that the CPU 41 causes coding and transmission at step F206 in response to input of audio data from the CD player or the like.

That is, in this case, when input of audio data via the digital input terminal 27 or the line input terminal 26 is started, the CPU 41 causes the DSP 49 to compress the audio data. Then, the CPU 41 causes the SAM 50 to code resulting compressed audio data and then transmit resulting coded audio data to the USB interface 43. Then, the CPU 41 causes the USB interface 43 to transmit the coded audio data to the personal computer 11.

The copying or movement operation as operation (4) is realized in this manner. That is, an operation of coding main data that is reproduced by an external reproducing apparatus such as a CD player or an MD player and then storing resulting coded main data in the HDD 11a is performed.

5-3 Operation (5)

Operation (5) is an operation of coding main data that is output from the CD-ROM drive 11c of the computer 11 in the drive apparatus 20 and then copying or moving resulting coded main data to the HDD 11a.

Also in this case, copying or movement is performed after the connection state between the personal computer 11 and the drive apparatus 20 is checked by basically the same processing as shown in FIGS. 7 and 8.

The personal computer 11 side allows a user to select main data as a subject of copying or movement by displaying, in the form of a list, the contents of a CD or a CD-ROM mounted in the CD-ROM drive 11c.

Steps F109-F113 in FIG. 7 and steps F205-F208 in FIG. 8 are also executed in this case in basically the same manners. However, operation (5) is different from the above-described operation (3) in that the CPU 41 causes coding and transmission at step F206 in response to input of audio data from the personal computer 11.

That is, in this case, when input of audio data via the USB interface 43 is started after reception of a copy or move command from the personal computer 11, the CPU 41 causes the DSP 49 to compress the audio data (when necessary). Then, the CPU 41 causes the SAM 50 to code resulting compressed audio data and then transmit resulting coded audio data to the USB interface 43. Then, the CPU 41 causes the USB interface 43 to transmit the coded audio data to the personal computer 11.

Naturally, after transmitting the copy or move command to the CPU 41, the personal computer 11 causes the CD-ROM drive 11c to perform a reproducing operation and transmits read-out audio data to the drive apparatus 20.

In this case, the transmission of audio data from the personal computer 11 to the drive apparatus 20 and the transmission of coded audio data from the drive apparatus 20 to the personal computer 11 are to be performed simultaneously. To this end, for example, communications may be made alternately in a time-divisional manner by a prescribed data amount each time.

The copying or movement operation as operation (5) is realized in this manner. That is, an operation of coding main data that is reproduced by the CD-ROM drive 11c and then storing resulting coded data in the HDD 11a is performed.

6. Operations Involving Reproduction from HDD

Next, operations (6), (7), and (8) as operations involving reproduction from the HDD 11a will be described individually. The term "data reproduced from the HDD 11a" as used here means coded main data that was recorded in the HDD 11a by one of the above-described operations (3), (4), and (5).

6-1 Operation (6)

Operation (6), that is, an operation of reproducing and outputting coded main data such as coded audio data recorded in the HDD 11a by processing of the drive apparatus 20, will be described with reference to FIGS. 9 and 10.

Figure 9:
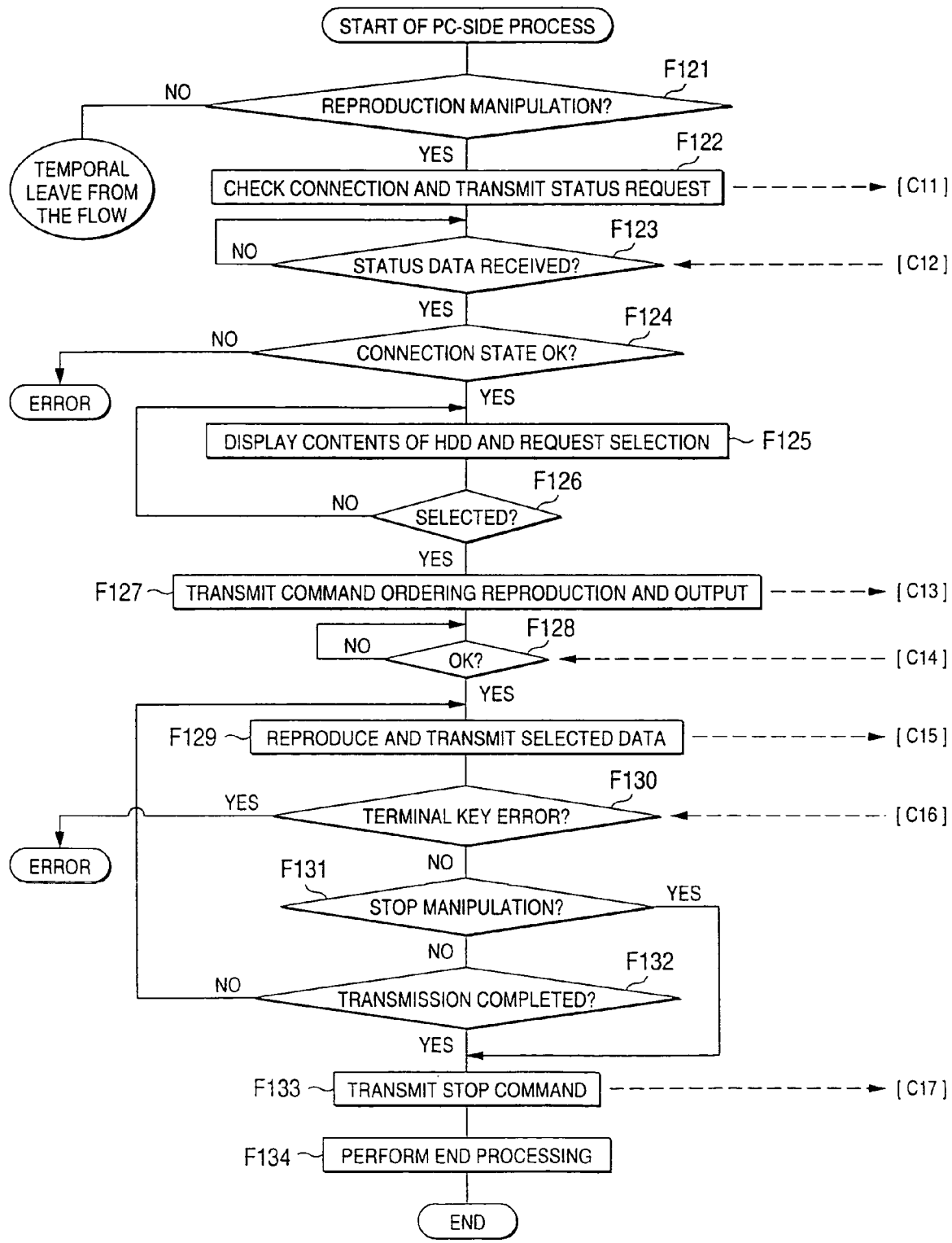
FIG. 9 is a flowchart showing a process on the personal computer side of operation (6) according to the first embodiment.
Figure 10:
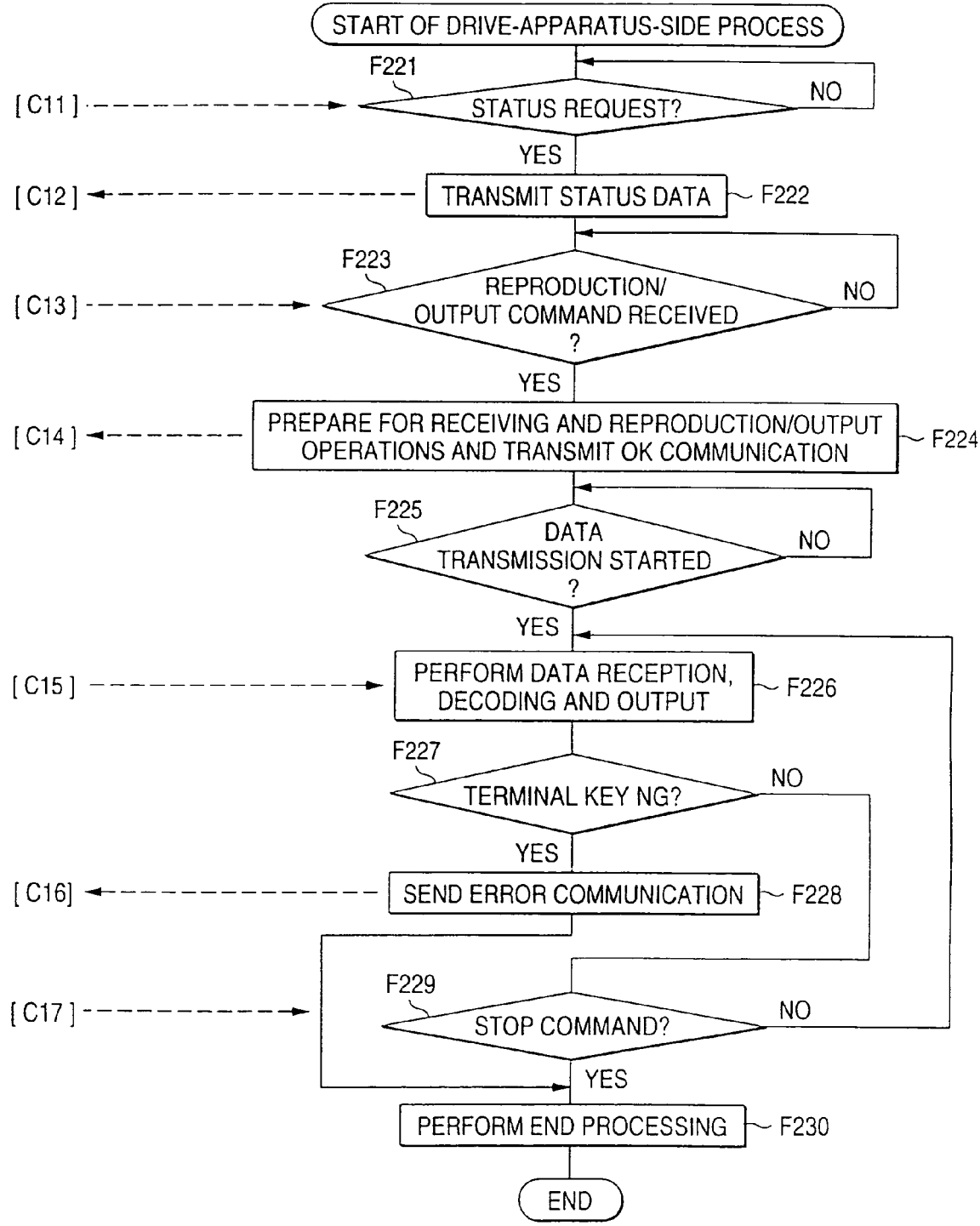
FIG. 10 is a flowchart showing a process on the drive apparatus side of operation (6) according to the first embodiment.

FIG. 9 shows a process on the personal computer 11 side and FIG. 10 shows a process that is executed by the CPU 41 of the drive apparatus 20.

A reproducing operation as operation (6) is also performed in a state that the drive apparatus 20 is connected to the personal computer 11. In this state, a user causes a reproducing operation by performing manipulations using, for example, the personal computer 11 side (e.g., manipulations using input devices of the personal computer 11 such as a keyboard and a mouse (not shown)).

When the user has performed, on the personal computer 11, manipulations for ordering reproduction of coded audio data in the HDD 11*a*, the process of the personal computer 11 proceeds from step F121 to step F122 (see FIG. 9). At step F122, first the personal computer 11 checks whether the drive apparatus 20 is connected to it.

Specifically, the personal computer 11 transmits a status request command (communication C11) to the CPU 41 of the drive apparatus 20 via the USB interface. At step F123, the personal computer 11 waits for a status reply (communication C12).

When the CPU 41 of the drive apparatus 20 receives the status request command (communication C11), the process proceeds from step F221 to step F222 (see FIG. 10). At step F222, the CPU 41 causes transmission of data indicating a current status. Specifically, the data indicates whether a state has been established that the drive apparatus 20 is ready for an operation of reproducing coded audio data that will be transmitted from the personal computer 11.

When the personal computer 11 receives the status data at step F123 in FIG. 9, at step F124 the personal computer 11 checks the status content and checks whether a proper connection state for reproduction is established.

Although not shown in FIGS. 9 and 10 in detail, if no status data is received from the drive apparatus 20 in response to the status request command for a prescribed time or more, or if it is detected that the terminal state of the USB connector (e.g., the voltages of the respective terminals) is a disconnection state, the personal computer 11 judges that the drive apparatus 20 is not connected to it and error termination is made after execution of step F124.

Error termination is also made when status data is received from the drive apparatus 20 but it indicates a state that the drive apparatus 20 is not ready for a reproducing operation. An example of such a state is that the drive apparatus 20 is currently performing a recording operation.

When it has been confirmed by the status check that a proper connection state is established, the process of the personal computer 11 goes to step F125, where the personal computer 11 displays, on the display screen, a list of song names or the like of the main data such as audio data recorded in the HDD 11*a*, as well as a request for selection of a song to be reproduced.

In response, the user performs a manipulation for selecting a song. In response to the manipulation for selection, the process of the personal computer 11 goes from step F126 to step F127, where the personal computer 11 transmits, to the CPU 41, a command (communication C13) instructing the CPU 41 to perform reproduction of a song as the selected file.

At step F128, the personal computer 11 waits for a communication (communication C14) indicating permission of a start of reproduction that will be transmitted from the drive apparatus 20.

When the CPU 41 receives the command (communication C13) ordering execution of reproduction, the process of the CPU 41 goes from step F223 to step F224, where the CPU 41 performs preparations for reproduction and output such as communication mode setting and transfer of the terminal key to the SAM 50 and issues an OK communication (communication C14) upon completion of the preparations. At step F225, the CPU 41 waits for transmission of coded audio data from the personal computer 11.

When the personal computer 11 receives the OK communication at step F128, the process goes to step F129, where the personal computer 11 reads out the coded audio data as a subject of reproduction from the HDD 11*a* and transmits it (communication C15) to the drive apparatus 20.

When transmission of the coded audio data (communication C15) is started, the process of the CPU 41 goes to step F226, where the CPU 41 starts operations of receiving, decoding, and outputting the coded audio data.

Specifically, the CPU 41 transfers, to the SAM 50, on a prescribed unit basis, the coded audio data that is received via the USB interface 43 and causes the SAM 50 to perform decoding using the terminal key.

Further, the CPU 41 causes the DSP 49 to expand audio data produced by the SAM 50 through decoding and then causes the ADDA conversion section 54 to convert resulting expanded audio data into an analog signal. Then, the CPU 41 causes output of the analog audio signal from the headphone terminal 23 or the line output terminal 24 via the power amplifier 56.

In this manner, the audio signal is reproduced and output as a voice from the output destination apparatus 101 connected to the drive apparatus 20, such as a headphone or a speaker system, or recorded by an MD recorder or the like. Where the drive apparatus 20 incorporates a speaker, it is naturally possible to produce a reproduction audio output from the speaker.

However, if proper decoding cannot be performed by the SAM 50 at a time point of the start of decoding at step F226, the CPU 41 judges that the terminal key is improper and the process goes to step F228, where the CPU 41 sends an error communication (communication C16) to the personal computer 11.

If the personal computer 11 receives an error communication (communication C16) after execution of step F129 was started, error termination is made after execution of step F130.

This corresponds to a case where the connected drive apparatus 20 is not the one that was used during a copying or movement operation as described above.

Since as described above the terminal key is a code number unique to each drive apparatus 20, if the connected drive apparatus 20 is different from the one that was used during a copying or movement operation, a key that is different from the proper one is used for decoding. Therefore, the decoding does not produce proper audio data.

In this case, error termination is made with a judgment that reproduction is impossible.

Several methods are conceivable to allow the CPU 41 to judge whether decoding has been performed properly, an example of which is to check the error correction status in the DSP 49. To this end, an algorithm of a coding process needs to be such that error correction is disabled unless decoding is performed by using the same terminal key.

Therefore, depending on the coding algorithm, there may occur a case that the CPU 41 cannot judge during reproduction whether decoding has been performed properly. That is, there may occur a case that steps F227, F228, and F130 cannot be executed properly in the system. However, this causes no problem. In other words, an example process is possible that does not include steps F227, F228, and F130.

Consider a case where decoded audio data is reproduced and output as it is without confirming that the decoding has been made properly. Even in this case, since decoding using a different terminal key cannot produce a proper audio output, a noise sound that is meaningless to a user is reproduced. In any case, the user cannot properly hear coded audio data that is read out from the HDD 11*a* in a state that a drive apparatus 20 that is different from the one that was used during a copying or movement operation is connected.

The personal computer 11 continues the HDD reproduction and transmission operations at step F129 until the transmission of the audio data is completed or the user performs a manipulation for stopping the reproduction. During that period, a reproduction audio output is produced by execution of step F226 by the CPU 41.

If the transmission of the audio data is completed or the user performs a manipulation for stopping the reproduction, the process of the personal computer 11 goes from step F131 or F132 to step F133, where the personal computer 11 transmits a stop command (communication C17) to the CPU 41. End processing is performed at step F134 and then the reproducing operation is finished.

When the CPU 41 receives the stop command, the process goes from step F229 to step F230, where end processing is performed. Then, the reproducing operation is finished.

The reproducing operation as operation (6) is realized by the above-described processes of FIGS. 9 and 10. That is, an operation of reproducing, via the drive apparatus 20, main data that is coded and stored in the HDD 11a is performed.

As is understood from the above description, a reproducing operation as described above is performed on condition that a drive apparatus 20 is connected to the personal computer 11 and the drive apparatus 20 should be the one that was used in recording coded main data in the HDD 11a.

This means that data that has been copied or moved to the HDD 11a can be reproduced only within the confines of personal use of a user, and hence no copyright infringement is caused.

6-2 Operation (7)

Operation (7) is an operation of decoding coded main data (e.g., coded audio data) recorded in the HDD 11a by processing of the drive apparatus 20 and then causing the personal computer 11 itself to reproduce and output resulting decoded main data.

In this case, reproduction and output are performed after the connection state between the personal computer 11 and the drive apparatus 20 is checked by basically the same processing as shown in FIGS. 9 and 10.

That is, after execution of steps F121-F128 in FIG. 9, the personal computer 11 performs readout from the HDD 11a and transmission to the drive apparatus 20 at step F129.

On the other hand, after execution of steps F221-F225 in FIG. 10, the CPU 41 receives and decodes transmitted coded audio data at step F226.

However, the CPU 41 causes the USB interface 43 to transmit received and decoded audio data to the personal computer 11.

The personal computer 11 outputs the transmitted audio data from the speaker 11b as a voice.

The reproducing operation as operation (7) is realized in this manner. That is, an operation of decoding, in the drive apparatus 20, main data that is coded and stored in the HDD 11a and then reproducing and outputting resulting decoded main data from the personal computer 11 is performed.

In this case, as in the case of operation (6), a reproducing operation is performed on condition that a drive apparatus 20 is connected to the personal computer 11 and the drive apparatus 20 should be the one that was used in recording coded main data in the HDD 11a. This means that data that has been copied or moved to the HDD 11a can be reproduced only within the confines of personal use of a user, and hence no copyright infringement is caused.

In addition, in this case, since a reproduction audio output is output from the personal computer 11, a reproducing operation that does not make a user feel incongruous is performed; that is, reproduction and output are performed by the very apparatus that is mounted with a recording medium (such as a CD) from which readout is being performed.

6-3 Operation (8)

An example of operation (8), that is, an operation of copying or moving coded main data such as coded audio data that is recorded in the HDD 11a to the plate-like memory 1 by processing of the drive apparatus 20, will be described with reference to FIGS. 11 and 12.

Figure 11:
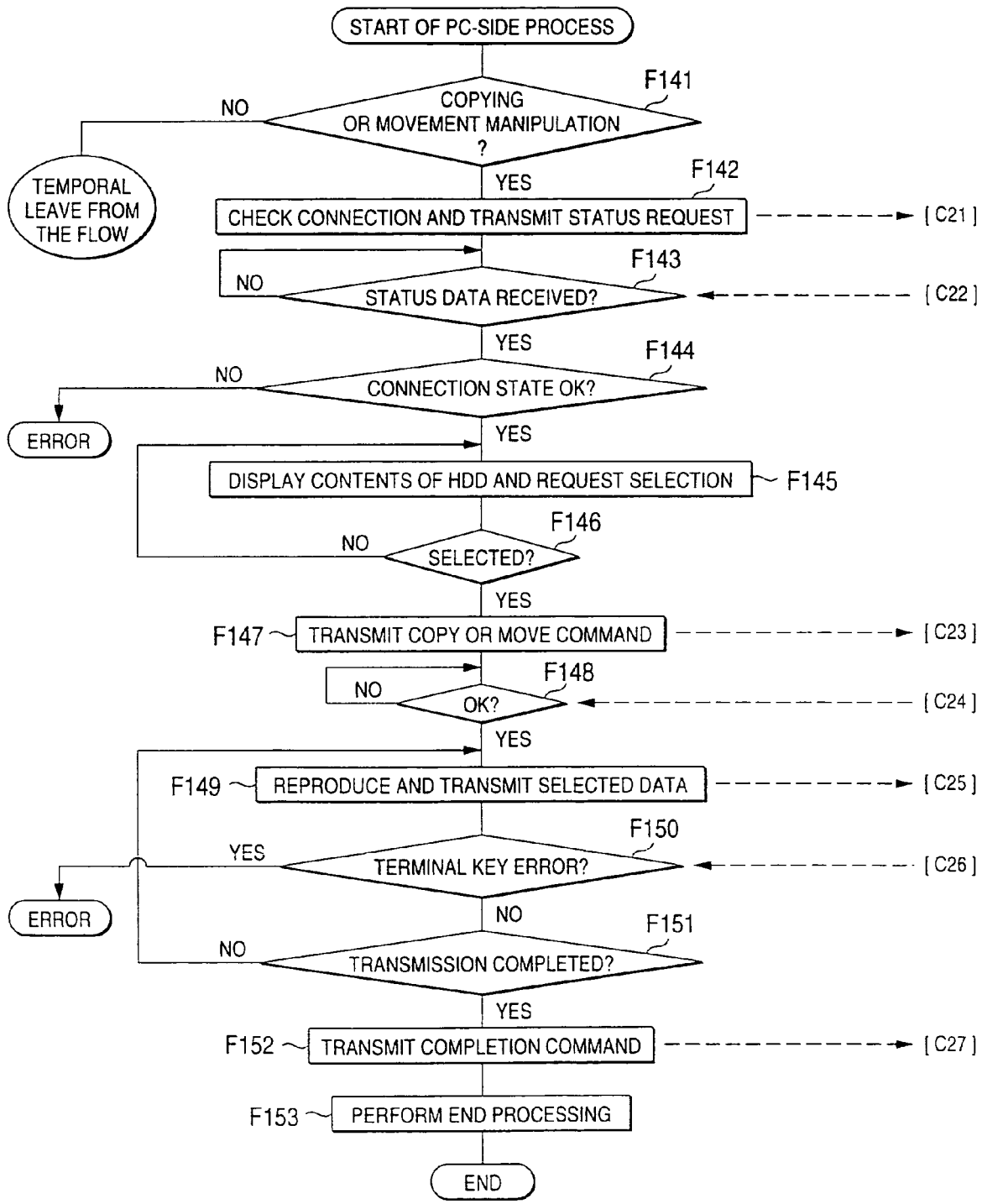
FIG. 11 is a flowchart showing a process on the personal computer side of operation (8) according to the first embodiment.
Figure 12:
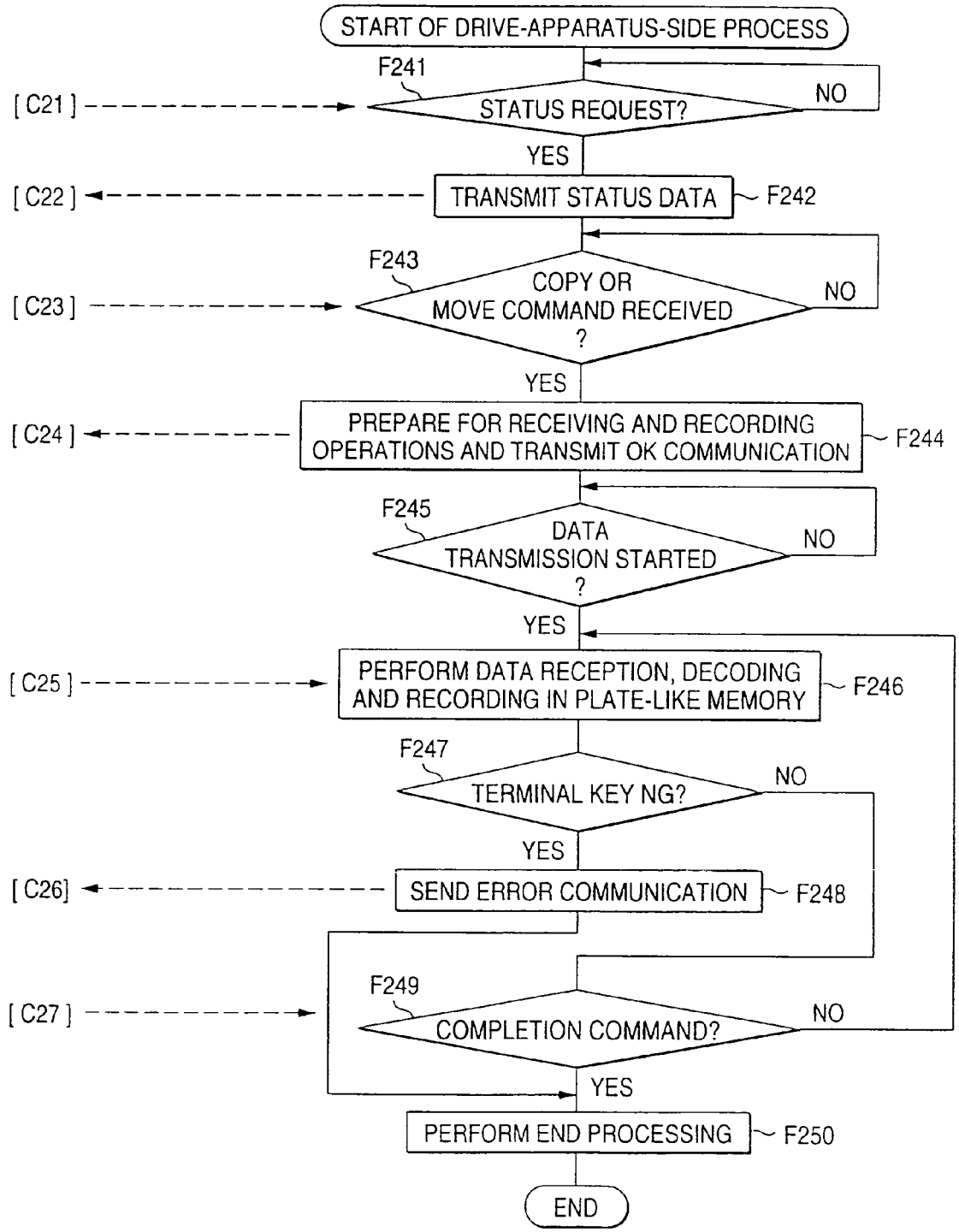
FIG. 12 is a flowchart showing a process on the drive apparatus side of operation (8) according to the first embodiment.

FIG. 11 shows a process on the personal computer 11 side and FIG. 12 shows a process that is executed by the CPU 41 of the drive apparatus 20.

Operation (8) is also performed in a state that the drive apparatus 20 is connected to the personal computer 11. In this state, a user causes a copying or movement operation by performing manipulations using, for example, the personal computer 11 side (e.g., manipulations using input devices of the personal computer 11 such as a keyboard and a mouse (not shown)).

When the user has performed, on the personal computer 11, manipulations for ordering copying or movement of coded audio data in the HDD 11a to the plate-like memory 1, the process of the personal computer 11 proceeds from step F141 to step F142 (see FIG. 11). At step S142, first the personal computer 11 checks whether the drive apparatus 20 is connected to it.

Specifically, the personal computer 11 transmits a status request command (communication C21) to the CPU 41 of the drive apparatus 20 via the USB interface. At step F143, the personal computer 11 waits for a status reply (communication C22).

When the CPU 41 of the drive apparatus 20 receives the status request command (communication C21), the process proceeds from step F241 to F242 (see FIG. 12). At step F242, the CPU 41 causes transmission of data indicating a current status. Specifically, the data indicates whether a state has been established that the drive apparatus 20 is ready for an operation of recording, in the plate-like memory 1, coded audio data that will be transmitted from the personal computer 11.

When the personal computer 11 receives the status data at step F143 (see FIG. 11), at step F144 the personal computer 11 checks the status content and checks whether a proper connection state for copying or movement is established.

Also in this case, if no status data is received from the drive apparatus 20 in response to the status request command for a prescribed time or more, or if it is detected that the terminal state of the USB connector (e.g., the voltages of the respective terminals) is a disconnection state, the personal computer 11 judges that the drive apparatus 20 is not connected to it and error termination is made after execution of step F144.

Error termination is also made when status data is received from the drive apparatus 20 but it indicates a state that the drive apparatus 20 is not ready for a copying or movement operation. Examples of such a state are that the drive apparatus 20 is currently performing another recording operation and that the plate-like memory 1 is not mounted.

When it has been confirmed by the status check that a proper connection state is established, the process of the personal computer 11 goes to step F145, where the personal computer 11 displays, on the display screen, a list of song names or the like of the main data such as audio data recorded in the HDD 11a, as well as a request for selection of a song to be copied or reproduced.

In response, the user performs a manipulation of selecting a song. In response to the manipulation for selection, the process of the personal computer 11 goes from step F146 to step F147, where the personal computer 11 transmits, to the CPU 41, a command (communication C23) instructing the CPU 41 to perform copying or movement of a song as the selected file to the plate-like memory 1.

At step F148, the personal computer 11 waits for a communication (communication C24) indicating permission of a start of reproduction that will be transmitted from the drive apparatus 20.

When the CPU 41 receives the command (communication C23) ordering execution of copying or movement, the process of the CPU 41 goes from step F243 to step F244, where the CPU 41 performs preparations for copying or movement such as communication mode setting and transfer of the terminal key to the SAM 50 and issues an OK communication (communication C24) upon completion of the preparations. At step F245, the CPU 41 waits for transmission of coded audio data from the personal computer 11.

When the personal computer 11 receives the OK communication at step F148, the process goes to step F149, where the personal computer 11 reads out the coded audio data as a subject of copying or movement from the HDD 11a and transmits it (communication C25) to the drive apparatus 20.

When transmission of the coded audio data (communication C25) is started, the process of the CPU 41 goes to step F246, where the CPU 41 starts operations of receiving, decoding, and writing the coded audio data.

Specifically, the CPU 41 transfers, to the SAM 50, on a prescribed unit basis, the coded audio data that is received via the USB interface 43 and causes the SAM 50 to perform decoding using the terminal key.

Further, the CPU 41 writes audio data decoded in the SAM 50 to the plate-like memory 1 via the memory interface 42.

In this manner, copying or movement to the plate-like memory 1 by the drive apparatus 20 is performed.

However, if proper decoding cannot be performed by the SAM 50 at a time point of the start of decoding at step F246, the CPU 41 judges that the terminal key is improper and the process goes to step F248, where the CPU 41 sends an error communication (communication C26) to the personal computer 11.

If the personal computer 11 receives an error communication (communication C26) after execution of step F149 was started, error termination is made after execution of step F150.

That is, if the connected drive apparatus 20 is not the one that was used during copying or movement to the HDD 11a as described above, it is impossible to copy or move, to the plate-like memory 1, the audio data that was copied or moved to the HDD 11a.

If the CPU 41 cannot judge whether the decoding has been performed properly, audio data that is considered to have been decoded is written to the plate-like memory 1. When a different terminal key was used, data that is written to the plate-like memory 1 is audio data of an unrecognizable noise sound. In any case, in a state that a drive apparatus 20 that is different from the one that was used during a previous copying or movement operation is connected, the user cannot properly copy or move coded audio data that is read out from the HDD 11a to the plate-like memory 1.

The personal computer 11 continues the HDD reproduction and transmission operations at step F149 until the transmission of the audio data is completed.

When the transmission of the audio data is completed, the process of the personal computer 11 goes from step F151 to step F152, where the personal computer 11 transmits a completion command (communication C27) to the CPU 41. End processing is performed at step F153 and then the copying or movement operation is finished. When the operation performed is a move operation, the audio data is erased from the HDD 11a as part of the end processing.

When the CPU 41 receives the completion command, the process goes from step F249 to step F250, where end processing is performed. Then, the copying or movement operation is finished.

The copying or movement operation as operation (8) is realized by the above-described processes of FIGS. 11 and 12. That is, an operation of recording, in the plate-like memory 1, via the drive apparatus 20, main data that is coded and stored in the HDD 11a is performed.

Also in this case, as described above, conditions are imposed that a drive apparatus 20 is connected to the personal computer 11 and that the drive apparatus 20 should be the one that was used in recording coded main data in the HDD 11a. Therefore, data that has been copied or moved to the HDD 11a can be reproduced only within the confines of personal use of a user, and hence no copyright infringement is caused. For example, it is impossible to increase copied data limitlessly by recording data that has been copied to the HDD 11a in a plate-like memory 1 by using another drive apparatus 20.

On the other hand, within correct use, such an operation as returning data that has been moved to the HDD 11a to the original plate-like memory 1 can be performed.

Referring to FIG. 6, the drive apparatus 20 plus the plate-like memory 1 as a portable unit can be detached from the personal computer 11. When the portable unit is removed from the personal computer 11 and carried out, an audio file can be reproduced only by the portable unit. Where the same audio file is recorded in the HDD 11a of the personal computer 11 and recorded in the portable unit and carried out and there is a possibility that it is reproduced by the portable unit as mentioned above, this state is not preferable in terms of copyright protection if the audio file can be reproduced by the personal computer 11.

By making it impossible for the personal computer 11 to properly reproduce, by itself, an audio data file recorded in the HDD 11a, the audio data file made a plurality of copies that can be reproduced properly can be restricted to the file that is processed by the portable unit. Copyright protection can easily be attained in this manner.

For example, the coding section and the decoding section of the drive apparatus 20 may be merely an encoder and a decoder, respectively. That is, when an audio data file was encoded according to a signal compression scheme called ATRAC, for example, it cannot be reproduced properly unless the personal computer 11 is equipped with an ATRAC decoder. That is, a similar effect can be obtained even in a case where information is merely compressed.

There may occur a case that it is necessary to set a restriction that only the plate-like memory 1 from which audio data was moved to the HDD 11a is allowed to be a plate-like memory 1 to which the coded audio data that is read out from the HDD 11a is copied or moved.

With the condition that the drive apparatus 20 that was used during copying or movement to the HDD 11a is connected, the plate-like memory 1 itself is given no limitation. This may cause a case that limitless copying from the HDD 11a to many plate-like memories 1 can be performed.

Where this causes fear of copyright infringement etc., a process is preferable in which the CPU 41 checks the mounted plate-like memory 1 itself and copying or movement is permitted only when the plate-like memory 1 in which audio data concerned was originally recorded is mounted.

On the other hand, another process is possible in which such a check is not performed and coded audio data that is transmitted from the HDD 11*a*, for example, is recorded as it is, that is, without decoding it in the plate-like memory 1.

The reason for the above is as follows. In this case, it is possible to establish a state that coded audio data that is recorded in the plate-like memory 1 cannot be reproduced without using the drive apparatus 20 concerned, because decoding using the terminal key is performed during reproduction. Therefore, even if a large amount of copying is performed, copied data can substantially be used only within the confines of personal use of the user.

Alternatively, copying may be restricted according to the conventional SCMS scheme.

A configuration is possible in which coded audio data that is transmitted from the HDD 11*a* is decoded and resulting decoded audio data is again coded and recorded in the plate-like memory 1 as coded audio data. The terminal key that is used in this coding may be made different from the terminal key that is used in decoding the coded audio data that is transmitted from the HDD 11*a*.

Further, although in the above embodiment the personal computer 11*a* is used as an example of the second apparatus, the second apparatus may be an audio set having a large-capacity storage medium, a server that is connected to a LAN, or the like.

Figure 13:
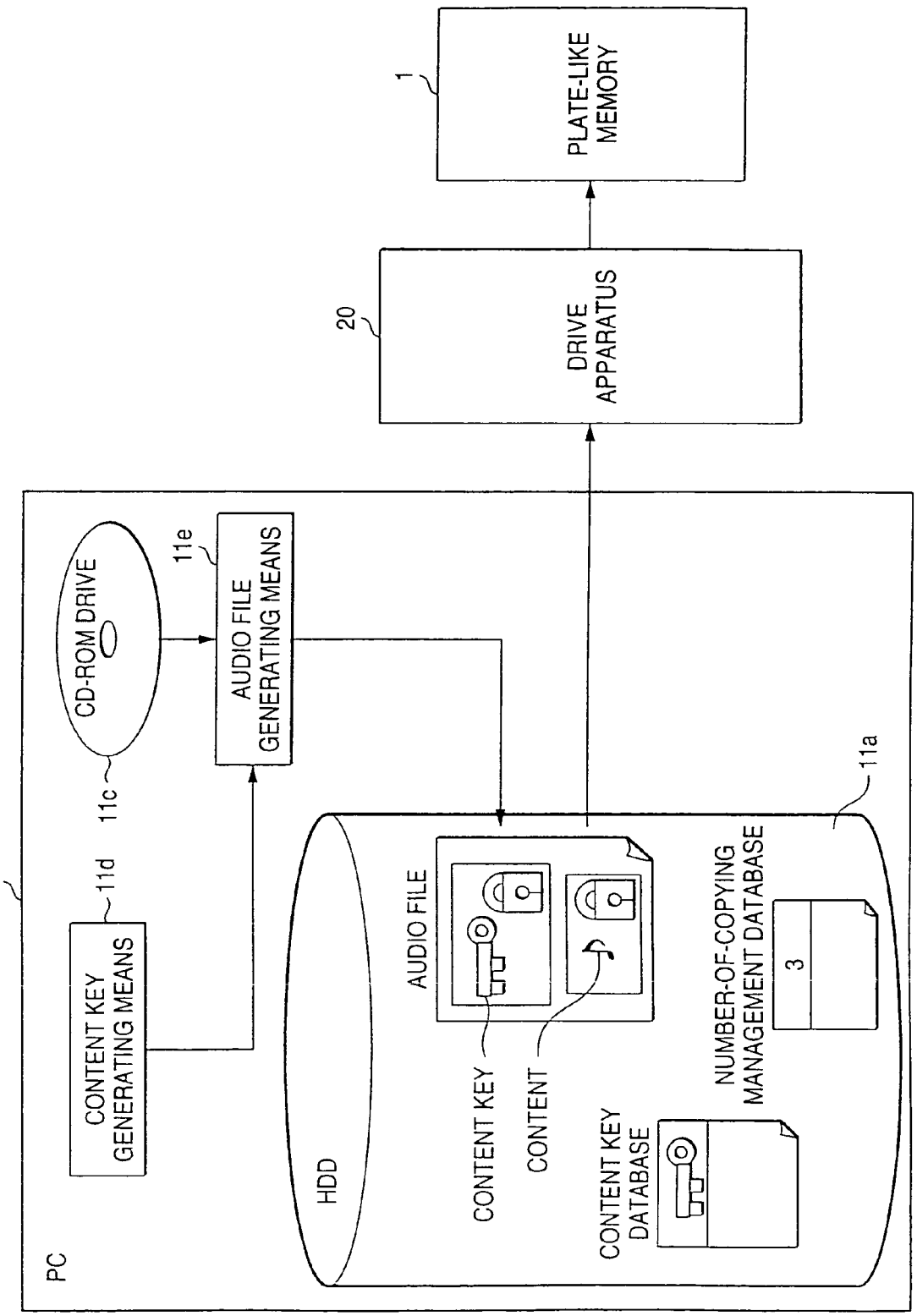
FIG. 13 is a block diagram showing a system according to a second embodiment of the invention.

FIG. 13 shows a second embodiment of the invention.

As shown in FIG. 13, a system of the second-embodiment consists of a personal computer 11, a drive apparatus 20, and a plate-like memory 1. The personal computer 11 includes an HDD 11*a*, a CD-ROM drive 11*c*, a content key generating means 11*d*, and an audio file generating means 11*e*. A content key database, a number-of-copying management database, and audio files can be stored in the HDD 11*a*.

First, a description will be made of an operation of copying, to the HDD 11*a*, audio data recorded on a recording medium such as a CD that is mounted in the CD-ROM drive 11*c*.

In copying, to the HDD 11*a*, audio data recorded on a recording medium such as a CD that is mounted in the CD-ROM drive 11*c*, first a management key called a content key is generated by the content key generating means 11*d*. (Contents keys are generated for respective audio data). Receiving the audio data and the content key generated by the content key generating means 11*d*, the audio file generating means 11*e* locks the received audio data by using the received content key and also locks the content key by using a storage key (not shown). The personal computer 11, the drive apparatus 20, and the plate-like memory 1 have their own storage keys, and the personal computer 11 shown in FIG. 13 and another personal computer 11B (not shown) have different storage keys. The audio file that has been generated by the audio file generating means 11*e* and is constituted of the audio data that was locked by the content key that is unique to the audio data and the content key that was locked by the storage key that is unique to the personal computer 11 is written to the HDD 11*a*. Then, for later authentication of the fact that the content key that was used in generating the audio file is the unique key that was generated in the personal computer 11, information relating to the content key is written to the content key database. As described later, in forming a copy of the above audio file in the plate-like memory 1, to manage the number of generated copies, a number "3," for example, as an upper limit of the number of times of copying is written to the number-of-copying management database so as to be correlated with the generated audio file.

Next, a description will be made of a process that is executed in generating a copy of the audio file newly generated by the above operation in the plate-like memory 1 via the drive apparatus 20.

In this case, first a state is established that data communication of the audio file can be performed between the personal computer 11 and the drive apparatus 20. Then, after data communication between the drive apparatus 20 and the plate-like memory 1 is enabled, the audio file in the personal computer 11 is copied to the plate-like memory 1.

Of the above two processes for establishing a state that data communication is possible, the process for establishing a state that data communication can be performed between the personal computer 11 and the drive apparatus 20 will be described below with reference to FIGS. 14 and 15.

Figure 14:
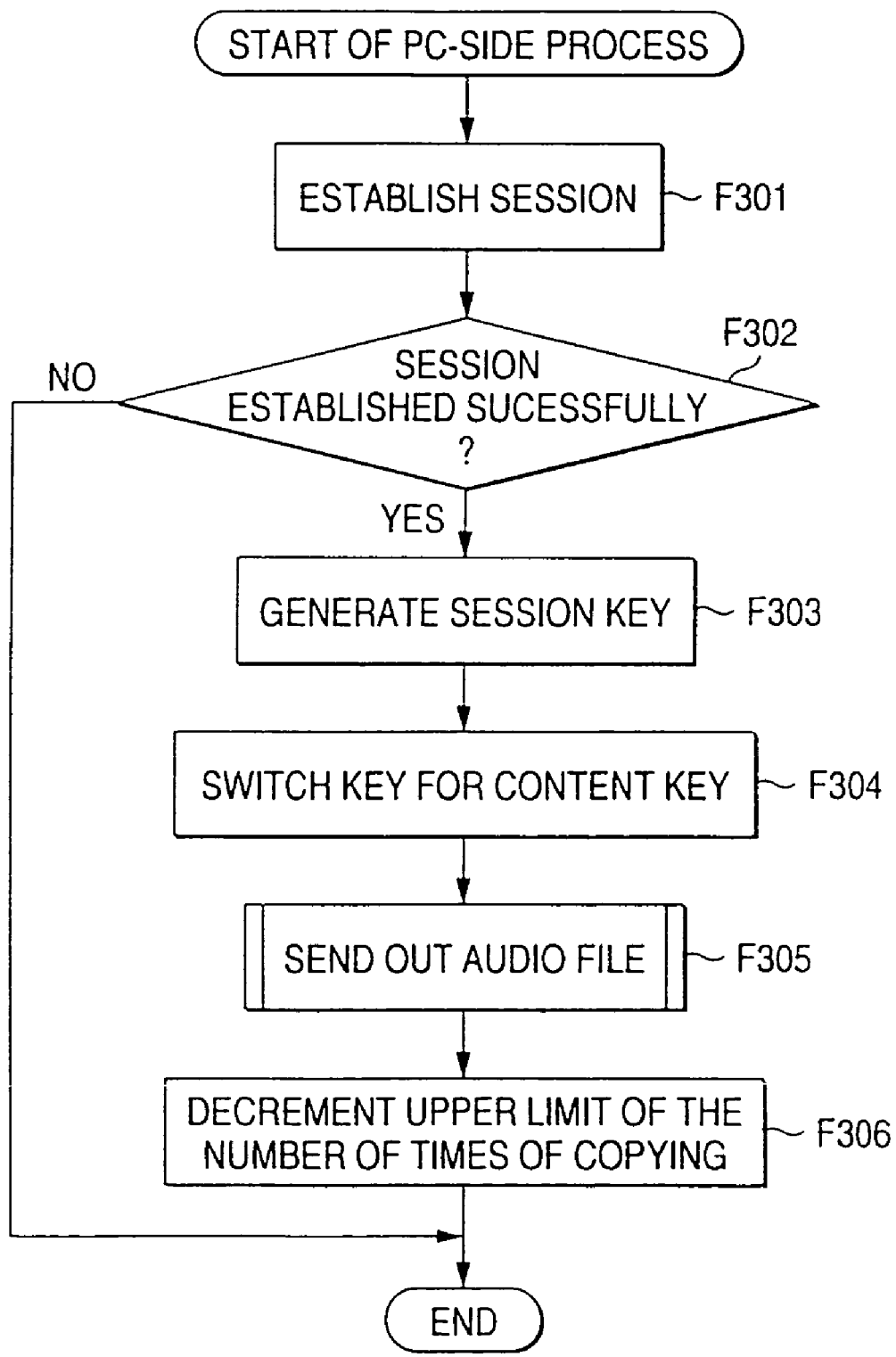
FIG. 14 is a flowchart showing a personal-computer-side process according to the second embodiment that is executed in producing a copy of an audio file in a plate-like memory.
Figure 15:
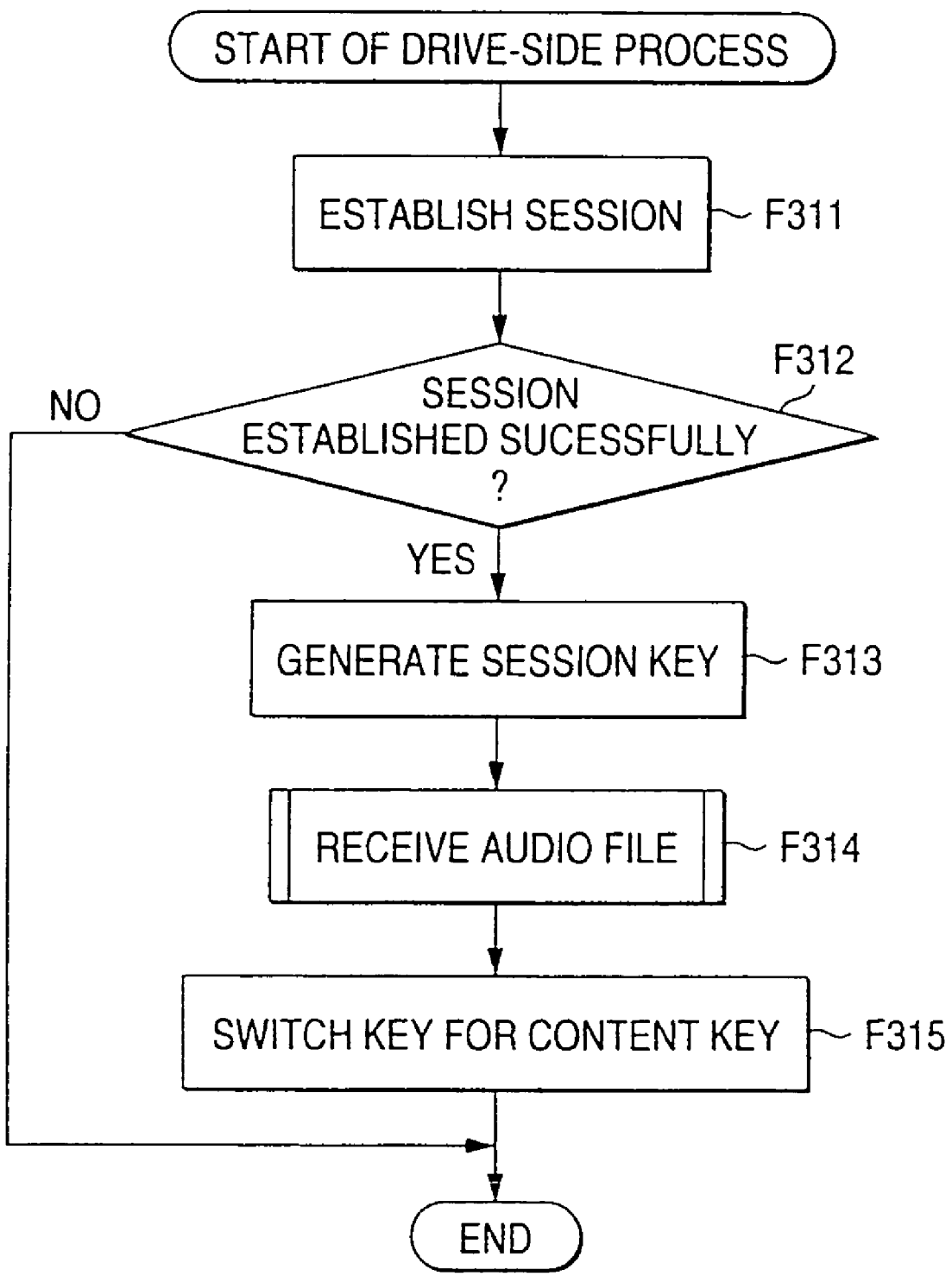
FIG. 15 is a flowchart showing a drive-apparatus-side process according to the second embodiment that is executed in producing a copy of the audio file in the plate-like memory.

FIG. 14 shows a process that is executed by the personal computer 11 and FIG. 15 shows a process that is executed by the drive apparatus 20.

By using the personal computer 11 or the drive apparatus 20, a user instructs the personal computer 11 and the drive apparatus 20 to copy an audio file recorded in the personal computer 11 to the plate-like memory 1. When so instructed, at steps F301 and F311 the personal computer 11 and the drive apparatus 20 confirm, through establishment of a session, whether the counterpart apparatus is allowed to copy a copyright-managed audio file. At steps F302 and F312, the personal computer 11 and the drive apparatus 20 judge whether they confirmed that the counterpart apparatus is allowed to make a communication for copying at steps F301 and F311. If at least one of the two apparatuses is not allowed to make a copy, a session cannot be established at steps F301 and F311 and hence the processes are finished without performing communication processing for copying.

If both apparatuses are allowed to make a copy, the processes go to steps F303 and F313, respectively, where the personal computer 11 and the drive apparatus 20 generate a session key based on information that was obtained when a session was established at steps F301 and F311. The session key is an encryption key that is generated to safely exchange data when the data are exchanged between a plurality of apparatuses through communications. The session key is used for coding and decoding and is effective only while the session is kept established.

At step F304, the personal computer 11 performs key switching; that is, the personal computer 11 cancels, by using the storage key, the locking of the content key with which the content of the audio file recorded in the HDD 11*a* was locked and locks the content key by using the session key that was generated at step F303. As a result of the execution of step F304, a temporary audio file is generated that is constituted of the content that was locked by the content key and the content key that was locked by the session key. At step F305, the personal computer 11 transmits this temporary audio file generated at step F304 to the drive apparatus 20.

At step F314, the drive apparatus 20 receives the audio file that is transmitted from the personal computer 11 at step F305. At step F315, the drive apparatus 20 cancels the locking of the content key that is included in the received audio file by using the session key that was generated at step F313, and protects the content key by locking it by using the storage key that is unique to the drive apparatus 20.

At step F306, the personal computer 11 changes the upper limit of the number of times of copying of the audio file that is recorded in the number-of-copying management database recorded in the HDD 11*a* from "3" to "2." The session for copying of the audio file that is established between the personal computer 11 and the drive apparatus 20 is now finished, and the session key that was generated at steps F303 and F313 is discarded.

Processes similar to the above are also executed by the drive apparatus 20 and the plate-like memory 1, in which the drive apparatus 20 executes a process similar to the process of the personal computer 11 shown in FIG. 14 and the plate-like memory 1 executes a process similar to the process of the drive apparatus 20 shown in FIG. 15. As a result, the audio file recorded in the personal computer 11 is safely copied to the plate-like memory 1 while the number of times of copying is managed. However, when the audio file is copied from the drive apparatus 20 to the plate-like memory 1, a step on the drive apparatus 20 side of managing the number of times of copying that corresponds to step F305 is omitted. That is, the management of the number of times of copying is performed in a unified manner only by the personal computer 11 that first generated the audio file concerned.

Naturally, before execution of the above processes, the personal computer 11 confirms that the upper limit of the number of times of copying that is recorded in the number-of-copying management database is not "0" and judges whether the copying concerned is within the allowable range of the copyright management. If the upper limit of the number of times of copying that is recorded in the number-of-copying management database is "0," a massage to the effect that, for example, the upper limit of the number of times of copying that the user is permitted has been reached is displayed on a display device of the personal computer 11, the display section 21 of the drive apparatus 20, or the like and entrance to the above-described processes is prohibited. In this manner, the copyright is protected and the user is informed of the fact that the copying concerned is out of the allowable range.

An operation of producing a copy in a state that the upper limit of the number of times of copying is prescribed will be hereinafter called "checkout." A reverse operation of returning, when, for example, an audio file recorded in the plate-like memory 1 has become unnecessary, the audio file to the personal computer 11, erasing the copied audio file from the plate-like memory 1, and incrementing, by one, the upper limit of the number of times of copying that is managed in the personal computer 11 will be hereinafter called "checkin." Alternatively, the checkin operation may be such that only a content key, rather than the entire audio file, is returned and the audio file is erased from the plate-like memory 1.

Next, with reference to FIGS. 16-19, a description will be made of how the use right of an audio file copied to the plate-like memory 1 is returned to the personal computer 11 when the audio file has becomes unnecessary. The following description will be directed to a case where the use right of an audio file is returned by returning only a content key indicating presence of the use right rather than the entire audio file.

Figure 16:
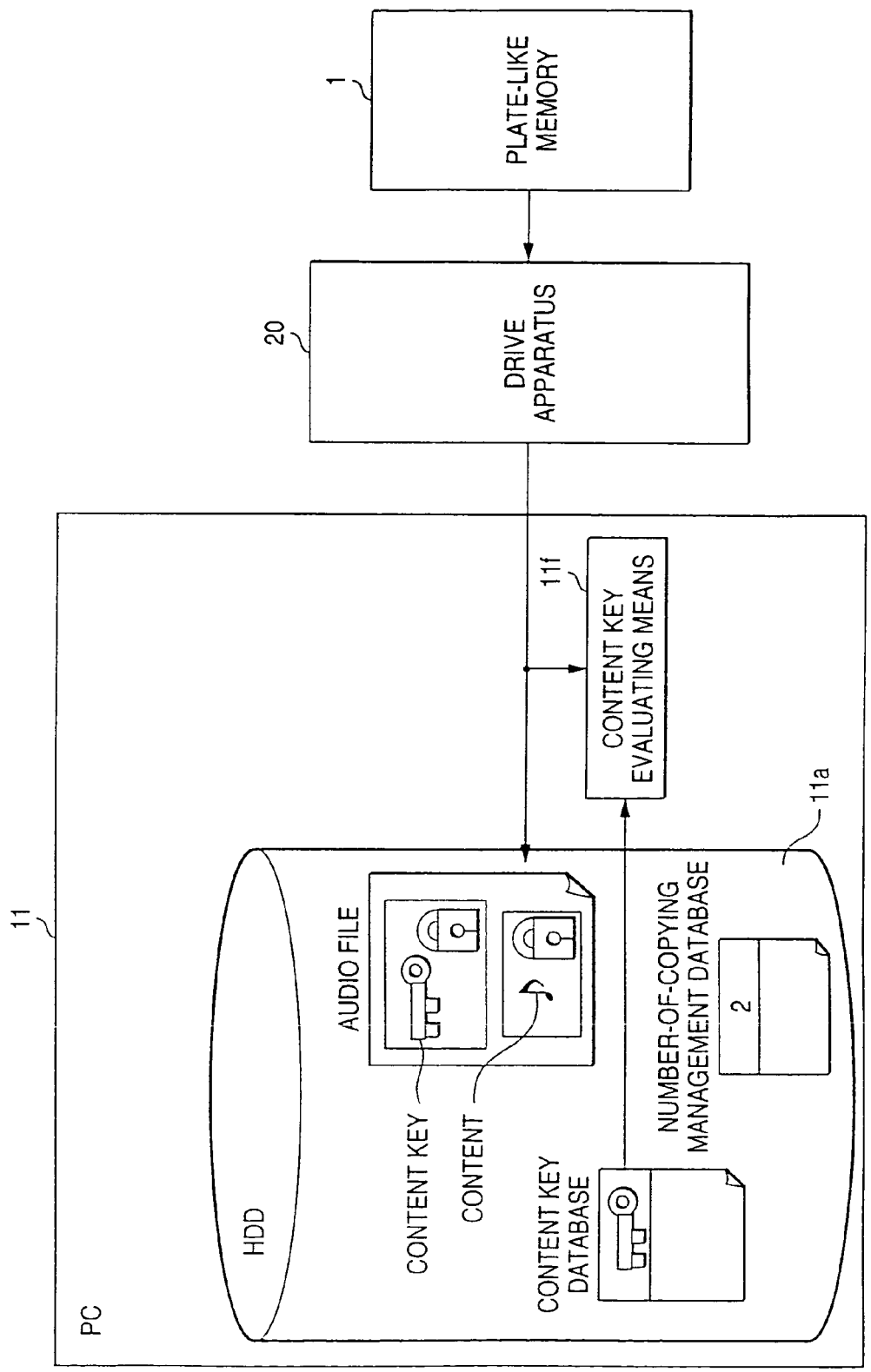
FIG. 16 is a block diagram showing a system according to the second embodiment of the invention.

As shown in FIG. 16, the personal computer 11 includes the HDD 11*a* and a content key evaluating means 11*f*. An audio file, a content key database, and a number-of-copying management database are recorded in the HDD 11*a*.

Figure 17:
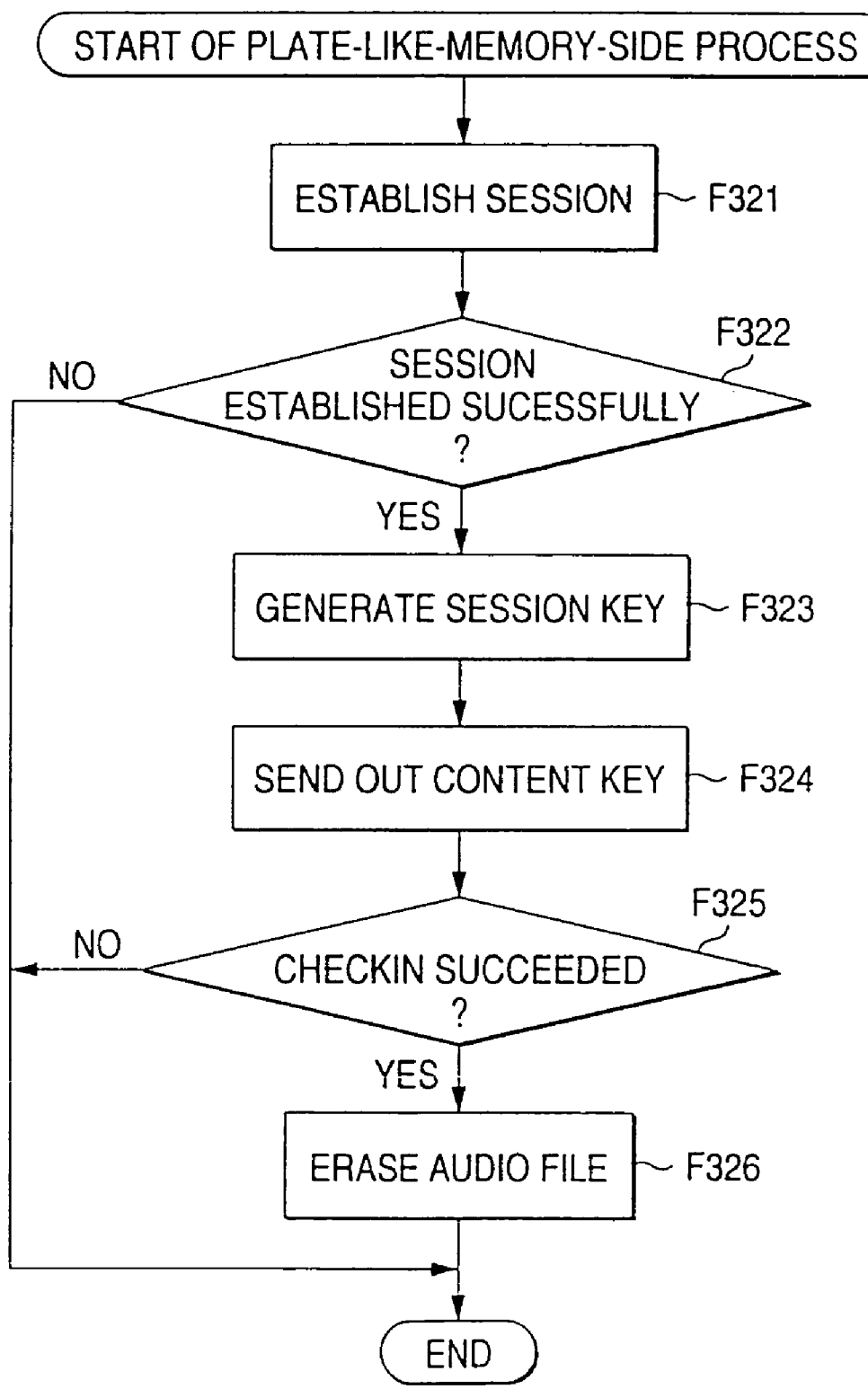
FIG. 17 is a flowchart showing a plate-like-memory-side process according to the second embodiment that is executed in returning the use right of an audio file to a personal computer.
Figure 18:
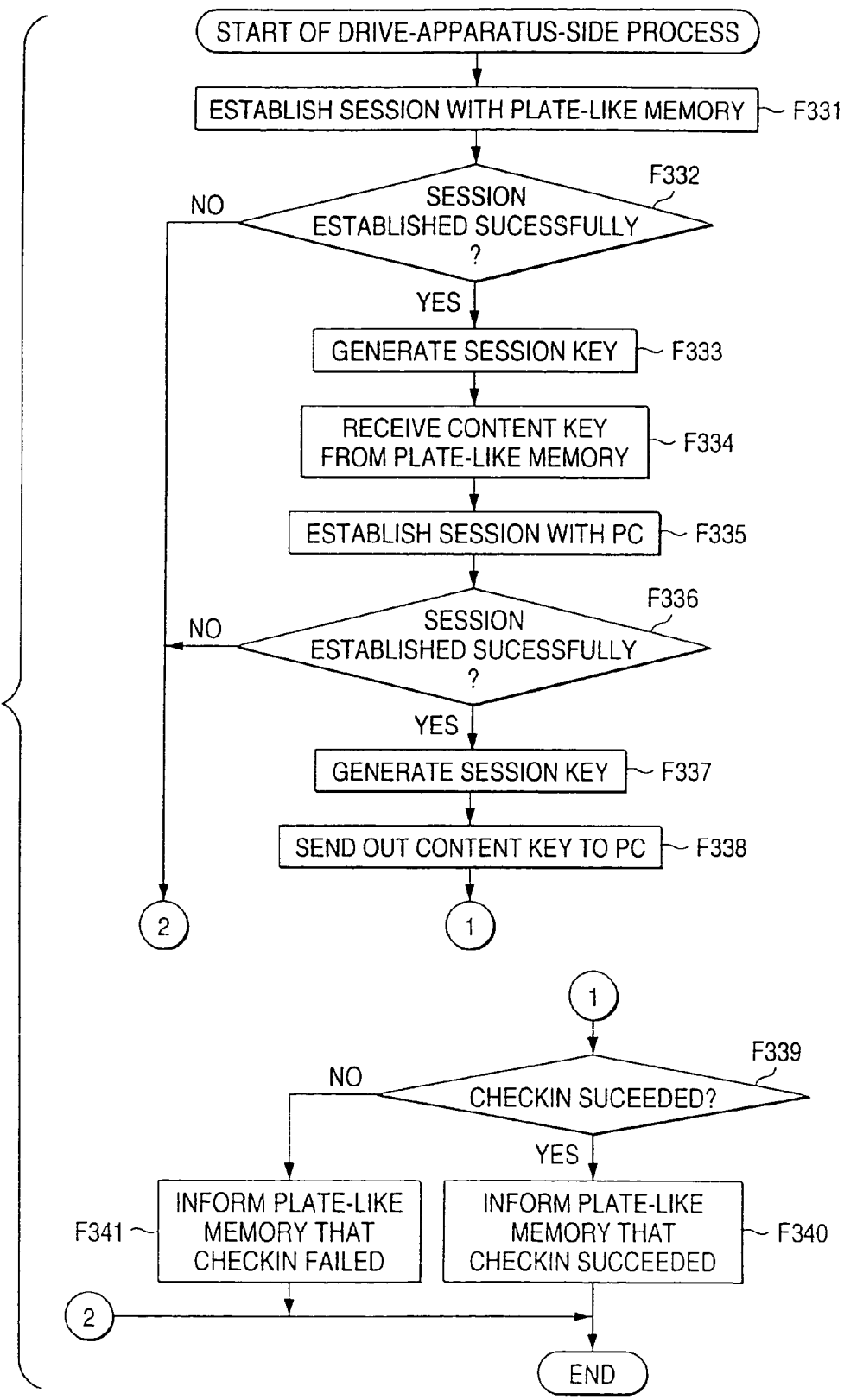
FIG. 18 is a flowchart showing a drive-apparatus-side process according to the second embodiment that is executed in returning the use right of the audio file to the personal computer.
Figure 19:
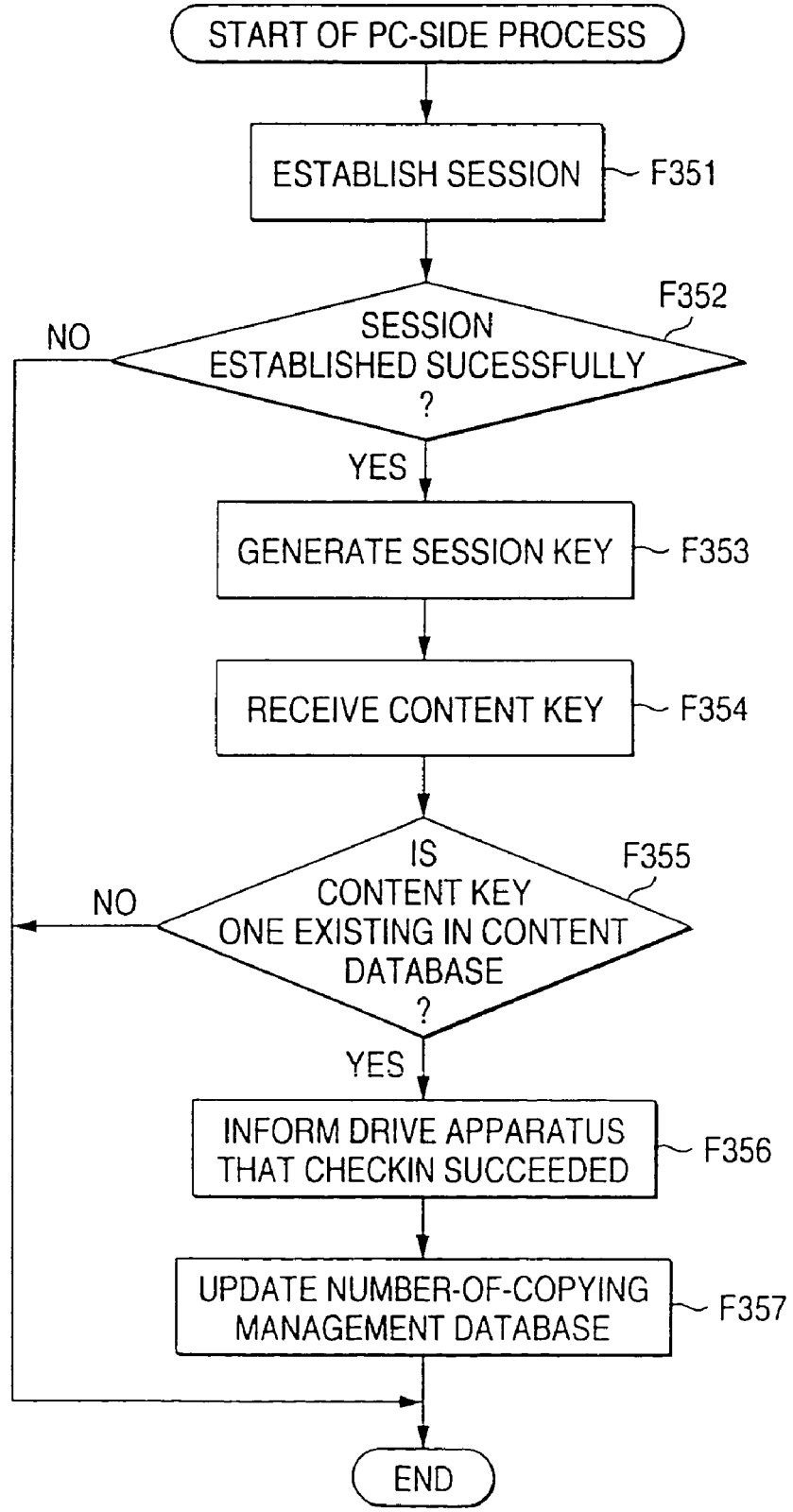
FIG. 19 is a flowchart showing a personal-computer-side process according to the second embodiment that is executed in returning the use right of the audio file to the personal computer.

FIGS. 17-19 show processes that are executed by the plate-like memory 1, the drive apparatus 20, and the personal computer 11, respectively.

When the user orders, by using, for example, the drive apparatus 20 or the personal computer 11, returning of the use right of an audio file copied to the plate-like memory 1 through updating of the number-of copying management database of the personal computer 11, at steps F321 and F331 the plate-like memory 1 and the drive apparatus 20 try to establish a session between them. At step F322, the plate-like memory 1 judges a result of the above attempt. If a session was established successfully, the process goes to step F323. If the attempt of establishing a session failed, the subsequent steps are skipped and the execution of the process is finished because there is a possibility that the counterpart with which the attempt of establishing a session was made does not have any mechanism for protecting copy-right-protected contents.

At step F332, the drive apparatus 20 judges a result of the execution of step F331. If it is judged that a session was established successfully, that is, the plate-like memory 1 has a mechanism for protecting the copyright, the process goes to step F333. If it is judged at step F332 that a session was not established, the subsequent steps are skipped and the execution of the process is finished. The copyright is protected by not operating with the plate-like memory 1 that may not have any mechanism for protecting the copyright.

If it is judged at step F322 that a session was established successfully, at step F323 the plate-like memory 1 generates a session key based on data that was obtained when the session was established. A session key is re-generated every time a session is established, and is discarded when the session is finished. If it is judged at step F332 that a session was established successfully, the process of the drive apparatus 20 goes to step F333, where a session key is generated based on data that was obtained when the session was established.

At step F324, the plate-like memory 1 cancels, by using the storage key that is unique to the plate-like memory 1, the locking of the content key of the audio file whose use right is to be returned. Further, the plate-like memory 1 again locks the content key by using the session key that was generated at step F323, and sends out the locked content key to the drive apparatus 20. At step F334, the drive apparatus 20 receives the locked content key from the plate-like memory 1.

At step F335, the drive apparatus 20 tries to establish a session with the personal computer 11. At step F351, the personal computer 11 tries to establish a session with the drive apparatus 20.

At step F336, the drive apparatus 20 judges whether a session was established successfully with the personal computer 11 at step F335. If it is judged that a session was established successfully, the process goes to step F337. If a session was not established, the drive apparatus 20 judges that the personal computer 11 may not have any mechanism for protecting the copyright and skips the subsequent steps and finishes the execution of the process. If the personal computer 11 judges at step F352 that a session was established successfully with the drive apparatus 20 at step F351, the process goes to step F353. If a session was not established with the drive apparatus 20 at step F351, the personal computer 11 judges that the drive apparatus 20 may not have any mechanism for protecting the copyright and skips the subsequent steps and finishes the execution of the process.

At step F337, the drive apparatus 20 generates a session key based on data that was obtained when the session was established with the personal computer 11. At step F353, the personal computer 11 generates a session key based on data that was obtained when the session was established with the drive apparatus 20.

At step F338, the drive apparatus 20 cancels, by using the storage key that is unique to the drive apparatus 20, the locking of the content key that was sent from the plate-like memory 1 and locked by the storage key that is unique to the drive apparatus 20. Further, the drive apparatus 20 locks the content key by using the session key that was generated at step F337 and sends out the locked content key to the personal computer 11. At step F354, the personal computer 11 receives the locked content key from the drive apparatus 20.

At step F355, the personal computer 11 cancels, by using the session key that was generated at step F353, the locking of the content key that was sent from the drive apparatus 20 and locked by the session key. Further, the personal computer 11 judges, with the content key evaluating means 11*f*, whether the obtained content key is one that is managed in the content key database in the HDD 11*a*. If a judgment result is affirmative, the process goes to step F356. If the judgment result is negative, the process is finished with a judgment that the content key concerned is for a content that was copied by another personal computer.

If it is judged at step F355 that the content key that was sent from the drive apparatus 20 is one that is managed in the content key database, at step F356 the personal computer 11 informs the drive apparatus 20 that the checkin succeeded. That is, the personal computer 11 informs the drive apparatus 20 that it has been confirmed that the content recorded in the plate-like memory 1 is a copy of the content that was issued by the personal computer 11 itself and is in a copyright-protected state, and that returning of the use right of the content concerned that is recorded in the plate-like memory 1 has been permitted.

Then, at step F357, the personal computer 11 updates the upper limit of the number of times of copying that is recorded in the number-of-copying management database. If number "2" is recorded as the upper limit of the number of times of copying as shown in FIG. 16, the upper limit is updated to "3" because one use right of the content has been returned from the plate-like memory 1.

At step F339, the drive apparatus 20 judges whether the chekin of the content key that was received from the plate-like memory 1 and then sent to the personal computer 11 succeeded in the personal computer 11. If it is judged that the chekin succeeded, the process goes to step F340. If it is judged that the chekin did not succeed, the process goes to step F341.

If it is judged at step F339 that the checkin in the personal computer 11 succeeded, at step F340 the drive apparatus 20 informs the plate-like memory 1 that the checkin succeeded and the use right of the content concerned has been returned to the personal computer 11.

If it is judged at step F339 that the checkin did not succeed, at step F341 the drive apparatus 20 informs the plate-like memory 1 of failure of the checkin to communicate that the content key that was received from the plate-like memory 1 is not one that was issued from the personal computer 11 returning of the use right of the content to which was attempted.

At step F325, the plate-like memory 1 judges whether the checkin of the audio file succeeded returning of whose use right is being attempted on the personal computer 11. If a judgment result is affirmative, the process goes to step F326. If the judgment result is negative, the process is finished. At step F326, the plate-like memory 1 erases, from its storage device, the audio file whose use right has been returned. Then, the process is finished.

With the above processes, the use right of a copyright-protected content that was stored in the plate-like memory 1 is returned to the personal computer 1, the upper limit of the number of times of copying that the personal computer 11 is permitted is updated, and the audio file whose use right has been returned is erased from the plate-like memory 1. This makes it possible to establish an environment in which copyright is protected within a permitted range.

In the second embodiment, even if an audio file is copied, the content of the audio file cannot be reproduced unless a storage key that was used to lock the audio file is obtained. That is, the storage key plays a role that is equivalent to the role of the terminal key in the first embodiment. In other words, it can be said that each of the personal computer 11, the drive apparatus 20, and the plate-like memory 1 having respective storage keys has the function of the drive apparatus 20 in the first embodiment.

The invention is not limited to each of the above-described processes. For example, the personal computer 11 may inform, at step F356, the drive apparatus 20 that checkin succeeded after updating the number-of-copying management database at step F357. The judgment for the limitation of the number of times of copying may be done in the following manner. A comparing means is additionally provided that compares the count value of a counter of the number of times of copying with an upper limit. The count value is incremented by one every time a copy is produced, and decremented by one every time checkin is performed. If it is found that the number of times of copying has reached an allowable number through comparison between the count value and the separately stored upper limit, no further copying is permitted unless checkin is performed. Naturally, an upper limit may be set for each audio data file or a unified upper limit may be set for the entire personal computer 11.

Although the embodiments have been described above, the invention is not limited to the configurations and the operations of the embodiments. In particular, various modifications are possible for detailed procedures in the various operations described above.

In a system according to the invention, the recording medium corresponding to the first recording medium is not limited to the plate-like memory shown in FIGS. 1A-1D and may be any of solid-state memory media having other outer shapes, a memory chip, a memory card, a memory module, etc. Naturally, the memory device is not limited to a flash memory and may be any of other kinds of memory devices. Further, the invention can also be applied to a system that uses a disk-shaped recording medium such as a Mini disc, a DVD (digital versatile disc), a hard disk, or a CD-R rather than a solid-state memory.

Similarly, the term "second recording medium" as used in the invention is not limited to an HDD.

Although the above embodiments are directed to copying, movement, and reproduction of audio data such as musical data, they are just examples. For example, the invention is not limited to a track or a file of musical data and can also be applied to a moving picture file, a still picture file, a voice data file, etc. in completely the same manners.

As is apparent from the above description, where main data having the same content are recorded in a first recording medium and a second recording medium and were coded by a signal processing apparatus so that only the signal processing apparatus having a function of decoding the main data can reproduce the main data, the main data recorded in the second recording medium cannot be used while, for example, the first recording medium is mounted in the signal processing apparatus and the main data recorded in the first recording medium is being used. The main data recorded in the second recording medium is rendered usable by connecting the signal processing apparatus to the second recording medium.

In the invention, in transmitting main data such as musical data) that is recorded in a first recording medium to a second apparatus and thereby copying or moving it to a second recording medium, the main data is coded in a first apparatus by using, as a key, an identifier that is unique to the first apparatus. Coded main data is transmitted to the second apparatus and thereby copied or moved. In reproducing, by the second apparatus, the main data as coded data that has been copied or moved to the second recording medium in the above manner, the second apparatus checks its connection to the first apparatus and is allowed to read out the main data in a connected state. The read-out coded main data is transmitted to the first apparatus side, decoded by a decoding means by using, as a key, the identifier that is unique to the first apparatus, and then reproduced and output. Therefore, as for reproduction of copied or moved main data, the main data can be decoded properly by using the same identifier as used during coding and then reproduced only when the first apparatus that was used during the copying or movement is connected to the second apparatus. Decoding cannot be performed when any of other first apparatuses is connected.

Therefore, only the owner of the first apparatus that was used during the copying or movement can reproduce the copied or moved main data. That is, the copied or moved main data can be used or reproduced only within the confines of personal use of the user. The invention can thus provide a strong measure for preventing copyright infringement.

On the other hand, no restriction is imposed on further copying or movement of the coded main data that has been copied or moved to the second apparatus (i.e., copying or movement of main data that remains coded). Therefore, the user can use the main data in a flexible manner because he can move the main data to another apparatus or another recording medium when necessary. That is, not only the second apparatus (the term as used in the invention) but also any apparatus that can be connected to the first apparatus during reproduction can reproduce the coded main data. Therefore, the invention allows for use of a variety of data and carriage of data within the confines of personal use of the user who owns the first apparatus, and thereby improves the ease of use of the user.

The copying and movement according to the invention may be employed not only to protect copyright but also to handle, for example, data that is high in secrecy to a user. In the latter case, since the data cannot be reproduced by persons other than the user himself, that is, the owner of the first apparatus, a secrecy protection effect can be obtained.

In the invention, the identifier as the key to be used in coding and decoding main data is stored in the first apparatus or the data processing apparatus and coding and decoding that use the identifier are performed in the first apparatus. That is, the identifier is not transferred to another apparatus at the time of copying or movement. At other time points, it is not necessary to transmit the identifier itself to the outside of the first apparatus. This means that the identifier does not go out of the first apparatus at all. That is, a code number as the identifier is not stolen in a communication process, and it is impossible to enable a communication destination apparatus to use the identifier. Therefore, even a dishonest user who owns a first apparatus cannot do a copyright-infringing act by finding out the identifier and thereby evading the copyright protection scheme of the invention.

In the invention, the first apparatus or the data processing apparatus may be provided with reading means capable of reading out main data from the first recording medium and capturing it in the first apparatus. In this case, a data copying and moving system that realizes the above advantages can be established only by the first and second apparatuses.

Further, in this case, the first apparatus or the data processing apparatus can be used alone as a reproducing apparatus.

The first apparatus or the data processing apparatus may be provided with input means capable of capturing, in the first apparatus, main data that is read out from the first recording medium by inputting, to the first recording medium, the main data that is read out by a reproducing apparatus such as an external CD player capable of reproducing operation. In this case, even reproduction data such as musical data recorded on a CD supplied from an apparatus (e.g., a conventional apparatus) that does not employ the coding and decoding operations in copying or movement according to the invention can enjoy the advantages of the invention.

The same thing applies to a case where the second apparatus side can reproduce data in the first recording medium. That is, where the second apparatus is provided with reading means capable of reading out main data from the first recording medium and transmitting means capable of transmitting the main data that is reproduced by the reading means to the first apparatus, the first apparatus may be provided with receiving means capable of capturing the main data that is read out from the first recording medium in the first apparatus by receiving the main data that is transmitted from the transmitting means of the second apparatus. In this case, even data reproduced by the second apparatus can enjoy the advantages of the invention.

The output means of the first apparatus or the data processing apparatus of the invention may supply, as reproduction data, main data that is produced by the decoding means through decoding to an output apparatus that is connected to or incorporated in the first apparatus, and cause the output apparatus to reproduce and output the main data. In this case, reproduction and output by the first apparatus are enabled. For example, in the case of musical data, it can be output from a speaker or a headphone that is incorporated in or connected to the first apparatus. Or an operation is enabled that musical data is supplied to another apparatus such as an amplifier system or a recording apparatus from an output terminal and reproduced and output therefrom or recorded therein.

The output means of the first apparatus may cause the transmitting means to supply, as reproduction data, main data that is produced by the decoding means through decoding to the second apparatus. In this case, reproduction and output by the second apparatus side can be enabled. This reproduction data was originally read out by the second apparatus side and the first apparatus is to decode that coded data. Therefore, by returning the decoded main data to the second apparatus, a reproducing operation that does not make a user feel incongruous, that is, reproduction and output by the apparatus that reads out the main data from the recording medium, can be performed.

The first apparatus may be provided with writing means capable of writing data to the first recording medium, and the writing means may be enabled to write main data that is produced by the decoding means through decoding to the first recording medium. In this case, copying or movement of main data from the second apparatus, that is, returning of main data to the original recording medium (main data that was moved from the first recording medium to the second recording medium is returned to the first recording medium), can be performed.

As described above, in a system in which main data is supplied from a server apparatus (in which main data that is coded so that it cannot be reproduced by a plurality of units is recorded) to a terminal apparatus, the terminal apparatus can decode and reproduce the main data that is recorded on the server apparatus only when its connection to the server apparatus is confirmed. In a state that the terminal apparatus and the server apparatus are separated from each other, in which state connection to the server apparatus cannot be confirmed, main data that was recorded in the terminal apparatus in advance is decoded and reproduced. In this manner, for example, the terminal apparatus is used as an apparatus for reproducing the main data at outside places. When a user is in a room where connection to the server apparatus can be made, main data on the server apparatus can be reproduced. Therefore, more main data can be reproduced than when the user is located at an outside place. If the user records, in the terminal apparatus, main data that he wants to use at an outside place and then goes out carrying the terminal apparatus, the main data can be reproduced at the outside place. However, the server apparatus cannot reproduce main data because of absence of the terminal apparatus that coded the main data. Copyright protection can be attained in this manner.

What is claimed is:

1. An information distribution system comprising:
a server apparatus being connected to a terminal apparatus for supplying coded main data to the terminal apparatus, the server apparatus including:
memory means for recording at least one coded main data; and
transmitting means for transmitting to the terminal apparatus the coded main data that is read out from the memory means; and
the terminal apparatus for decoding and reproducing coded main data including:
receiving means for receiving the coded main data that is transmitted from the transmitting means of the server apparatus;
recording means for recording the coded main data;
decoding means for decoding the coded main data that is one of received by the receiving means and recorded in the recording means;
judging means for judging whether the terminal apparatus is connected to the server apparatus;
control means for controlling the decoding means to decode the coded main data received by the receiving means when the judging means judges that the terminal apparatus is connected to the server apparatus, and for controlling the decoding means to decode the coded main data recorded in the recording means when the judging means judges that the terminal apparatus is not connected to the server apparatus;
coding means for coding the main data, wherein the control means causes the coding means to encode the main data and causes the server apparatus to record the coded main data resulting therefrom; and
storing means for storing a key that is used when the coding means encodes the main data and used when the decoding means decodes the coded main data,
wherein the coding means encodes the main data by using the key stored in the storing means, and the decoding means decodes the coded main data by using the key stored in the storing means.

2. The information distribution system according to claim 1, wherein the terminal apparatus further comprises attaching and detaching means for attaching the recording means to the terminal apparatus in a detachable manner.

3. The information distribution system according to claim 1, wherein the key that is stored in the storing means is unique to the terminal apparatus.

4. The information distribution system according to claim 1, wherein the terminal apparatus further comprises reproducing means for reproducing decoded main data.

5. The information distribution system according to claim 1, wherein:
the terminal apparatus further comprises transmitting means for transmitting decoded main data produced by the decoding means; and
the server apparatus further comprises receiving means for receiving the decoded main data, and reproducing means for reproducing the decoded main data received by the receiving means,
whereby the server apparatus reproduces the main data decoded by the terminal apparatus.

6. The information distribution system according to claim 5, wherein the decoded main data that is transmitted from the transmitting means of the terminal apparatus is an audio signal.

7. The information distribution system according to claim 1, wherein the recording means of the terminal apparatus is a nonvolatile memory.

8. The information distribution system according to claim 1, wherein the memory means of the server apparatus is a hard disk drive.

* * * * *

UNITED STATES PATENT AND TRADEMARK OFFICE
CERTIFICATE OF CORRECTION

PATENT NO.        : 7,500,271 B2
APPLICATION NO.   : 10/869399
DATED             : March 3, 2009
INVENTOR(S)       : Teruyuki Shitara, Ichiro Mayama and Eiichi Yamada It is certified that error appears in the above-identified patent and that said Letters Patent is hereby corrected as shown below:

On the Title Page, Item (30), under Foreign Application Priority Data, "March 1, 2000, (JP) P2000-060328" should read --March 1, 2000, (JP) P2000-060382--.

Signed and Sealed this
Fifteenth Day of March, 2011

David J. Kappos
*Director of the United States Patent and Trademark Office*